(12) United States Patent
Yasumura

(10) Patent No.: US 7,242,595 B2
(45) Date of Patent: Jul. 10, 2007

(54) SWITCHING POWER SUPPLY CIRCUIT

(75) Inventor: Masayuki Yasumura, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 11/545,040

(22) Filed: Oct. 6, 2006

(65) Prior Publication Data

US 2007/0086219 A1    Apr. 19, 2007

(30) Foreign Application Priority Data

Oct. 7, 2005    (JP) ............................ P2005-295363
Oct. 11, 2005   (JP) ............................ P2005-296225

(51) Int. Cl.
   *H02M 3/335*    (2006.01)
(52) U.S. Cl. ..................... 363/21.02; 363/97
(58) Field of Classification Search .................. 363/15, 363/20, 21.1, 21.02, 21.03, 95, 97
   See application file for complete search history.

(56) References Cited

U.S. PATENT DOCUMENTS 6,831,846 B2 * 12/2004 Yasumura ................. 363/21.02
6,839,245 B2 * 1/2005 Yasumura ................. 363/21.02
7,170,761 B2 * 1/2007 Yasumura ..................... 363/17

FOREIGN PATENT DOCUMENTS

JP    2000-134925 A    5/2000

* cited by examiner

*Primary Examiner*—Adolf Berhane
(74) *Attorney, Agent, or Firm*—Lerner, David, Littenberg, Krumholz & Mentlik, LLP

(57) ABSTRACT

In a switching power supply circuit including a primary side rectifying and smoothing circuit, a switching element, a converter transformer, a secondary side rectifying and smoothing circuit, and a switching element controlling section, a first primary side series resonant circuit is formed by a choke coil and a primary side series resonant capacitor, a second primary side series resonant circuit is formed by a leakage inductance occurring in a primary winding and the primary side series resonant capacitor, and a secondary side series resonant circuit is formed by a leakage inductance occurring in a secondary winding and a secondary side series resonant capacitor.

9 Claims, 18 Drawing Sheets

SWITCHING POWER SUPPLY CIRCUIT

CROSS-REFERENCE TO RELATED APPLICATIONS

The present application claims priority from Japanese Patent Application Nos. JP 2005-295363 filed on Oct. 7, 2005, and Japanese Patent Application No. JP 2005-296225 filed on Oct. 11, 2005, the disclosures of which are hereby incorporated by reference herein.

BACKGROUND OF THE INVENTION

1. Field of the Invention

The present invention relates to a switching power supply circuit.

2. Description of the Related Art

As so-called soft-switching power supply of a resonant type, a current resonant type and a voltage resonant type are widely known. In a present situation, a current resonant converter of a half-bridge coupling system using two switching devices is in wide use because such a current resonant converter is easily put to practical use.

However, the characteristics of a high withstand voltage switching element, for example, are now being improved, and therefore the problem of withstand voltage in putting a voltage resonant converter to practical use is being cleared up. In addition, a voltage resonant converter formed as a single-ended type with one switching element is known to be advantageous as compared with a current resonant forward converter having one switching element in terms of input feedback noise, the noise component of a direct-current output voltage line, and the like.

FIG. 17 shows an example of configuration of a switching power supply circuit having a voltage resonant converter of the single-ended type. Such a voltage resonant converter is referred to as a multiple resonant converter with a series resonant circuit formed by a leakage inductor L2 on a secondary winding side and a secondary side series resonant capacitor C2 on a secondary side.

In the switching power supply circuit shown in FIG. 17, a rectifying and smoothing circuit formed by a bridge rectifier circuit Di and a smoothing capacitor Ci rectifies and smoothes a commercial alternating-current power AC, and thereby generates a direct-current input voltage Ei as a voltage across the smoothing capacitor Ci. Incidentally, a noise filter that is formed by a set of common mode choke coils CMC and two across capacitors CL and removes common mode noise is provided in the line of the commercial alternating-current power AC.

The direct-current input voltage Ei is input as a direct-current input voltage to the voltage resonant converter. As described above, the voltage resonant converter employs a configuration of the single-ended type with one switching device Q1. The voltage resonant converter in this case is an externally excited converter. The switching device Q1 of a MOSFET is switching-driven by an oscillating and driving circuit 2.

A body diode DD1 of the MOSFET is connected in parallel with the switching device Q1. A primary-side parallel resonant capacitor Cr is connected in parallel with the source and drain of the switching device Q1. The primary-side parallel resonant capacitor Cr and a leakage inductor L1 of a primary winding N1 of an isolated converter transformer PIT form a primary side parallel resonant circuit (voltage resonant circuit). This primary side parallel resonant circuit provides a voltage resonant operation as the switching operation of the switching device Q1.

The oscillating and driving circuit 2 applies a gate voltage as a driving signal to the gate of the switching device Q1 to switching-drive the switching device Q1. Thus the switching device Q1 performs switching operation at a switching frequency corresponding to the cycle of the driving signal.

The isolated converter transformer PIT transmits the switching output of the switching device Q1 to the secondary side. As for the structure of the isolated converter transformer PIT, as shown in FIG. 18, for example, the isolated converter transformer PIT has an EE-shaped core formed by combining an E-type core CR1 and an E-type core CR2 of ferrite material with each other. A winding part is divided into a primary side winding part and a secondary side winding part. The primary winding N1 and a secondary winding N2 are wound on a bobbin B covering the central magnetic leg of the EE-shaped core. In addition, a gap G of about 0.8 mm to 1.0 mm is formed in the central magnetic leg of the EE-shaped core of the isolated converter transformer PIT. Thereby a coupling coefficient k=about 0.80 to 0.85 is obtained between the primary side and the secondary side. The coupling coefficient k at this level may be considered to represent loose coupling, and correspondingly a state of saturation is not easily obtained. The value of the coupling coefficient k is a factor in setting leakage inductance (the value of inductance of the leakage inductor L1).

One end of the primary winding N1 of the isolated converter transformer PIT is inserted between the switching element Q1 and the positive electrode terminal of the smoothing capacitor Ci. Thereby, the switching output of the switching element Q1 is transmitted to the primary winding N1. An alternating voltage induced by the primary winding N1 occurs in the secondary winding N2 of the isolated converter transformer PIT.

In this case, a secondary side series resonant capacitor C2 is connected in series with one end of the secondary winding N2. Thus, the leakage inductor L2 of the secondary winding N2 and the capacitance of the secondary side series resonant capacitor C2 form a secondary side series resonant circuit (current resonant circuit).

In addition, a voltage doubler half-wave rectifier circuit is formed by connecting rectifier diodes Do1 and Do2 and a smoothing capacitor Co to the secondary side series resonant circuit as shown in the figure. This voltage doubler half-wave rectifier circuit generates a direct-current output voltage Eo having a level corresponding to twice a secondary winding voltage V3 induced in the secondary winding N2 as a voltage across the smoothing capacitor Co. The direct-current output voltage Eo is supplied to a load, and is also input to a control circuit 1 as a detection voltage for constant-voltage control.

The control circuit 1 inputs a detection output obtained by detecting the level of the direct-current output voltage Eo input as the detection voltage to the oscillating and driving circuit 2. The oscillating and driving circuit 2 outputs a driving signal varied in frequency or the like according to the level of the direct-current output voltage Eo indicated by the detection output input to the oscillating and driving circuit 2. The oscillating and driving circuit 2 thereby controls the switching operation of the switching element Q1 so as to make the direct-current output voltage Eo constant at a predetermined level. Thereby control is performed to stabilize the direct-current output voltage Eo.

FIGS. 19A, 19B, and 19C and FIG. 20 show results of experiments on the power supply circuit having the configuration shown in FIG. 17. In conducting the experiments, principal parts of the power supply circuit of FIG. 17 are set as follows.

The isolated converter transformer PIT has an EER-35 as the core, and has a gap length of 1 mm set for the gap of the central magnetic leg. As for the respective numbers T of turns of the primary winding N1 and the secondary winding N2, N1=39 T and N2=23 T. The level of an induced voltage per turn (T) of the secondary winding N2 is set to 3 V/T. The coupling coefficient k of the isolated converter transformer PIT is set to k=0.81.

The capacitance of the primary side parallel resonant capacitor Cr is selected to be Cr=3900 pF (picofarads), and the capacitance of the secondary side series resonant capacitor C2 is selected to be C2=0.1 pF (microfarads). Accordingly, the primary side parallel resonance frequency fo1=230 kHz (kilohertz) of the primary side parallel resonant circuit and the secondary side series resonance frequency fo2=82 kHz of the secondary side series resonant circuit are set. In this case, relative relation between the primary side parallel resonance frequency fo1 and the secondary side series resonance frequency fo2 can be expressed as fo1≈2.8×fo2.

The rated level of the direct-current output voltage Eo is 135 V. Load power handled by the power supply circuit is in a range of maximum load power Pomax=200 W to minimum load power Pomin=0 W.

FIGS. 19A, 19B, and 19C are waveform charts showing the operations of principal parts in the power supply circuit shown in FIG. 17 on the basis of the switching period of the switching element Q1. FIG. 19A shows a switching voltage V1 applied to the switching element Q1, a switching current IQ1, a primary winding current I2, a secondary winding current I3, a rectified current ID1, and a rectified current ID2 at the maximum load power Pomax=200 W. FIG. 19B shows the switching voltage V1, the switching current IQ1, the primary winding current I2, and the secondary winding current I3 at an intermediate load power Po=120 W. FIG. 19C shows the switching voltage V1 and the switching current IQ1 at the minimum load power Pomin=0 W.

The switching voltage V1 is a voltage obtained across the switching element Q1. The switching voltage V1 is at a zero level during a period TON during which the switching element Q1 is on, and forms a sinusoidal resonant pulse waveform during a period TOFF during which the switching element Q1 is off. The resonant pulse waveform of the switching voltage V1 indicates that the operation of the primary side switching converter is of a voltage resonant type.

The switching current IQ1 flows through the switching element Q1 (and the body diode DD1). The switching current IQ1 flows with waveforms shown in the figures during the period TON, and is at a zero level during the period TOFF.

The primary winding current I2 flowing through the primary winding N1 is obtained by combining a current component flowing as the switching current IQ1 during the period TON with a current flowing through the primary side parallel resonant capacitor Cr during the period TOFF. Though shown in only FIG. 19A, in the operation of the secondary side rectifier circuit, the rectified current ID1 and the rectified current ID2 flowing through the rectifier diodes Do1 and Do2 each flow sinusoidally, as shown in the figure. In this case, the resonant operation of the secondary side series resonant circuit appears in the waveform of the rectified current ID1 more dominantly than in the rectified current ID2.

The secondary winding current I3 flowing through the secondary winding N2 has a waveform obtained by combining the rectified current ID1 and the rectified current ID2 with each other. FIG. 20 shows switching frequency fs, the period TON and the period TOFF of the switching element Q1, and AC-to-DC power conversion efficiency (ηAC→DC) of the power supply circuit shown in FIG. 17 with respect to load variation.

First, looking at AC-to-DC power conversion efficiency (ηAC→DC), high efficiencies of 90% or more are obtained over a wide range of load power Po=50 W to 200 W. The present inventor has previously confirmed by experiment that such a characteristic is obtained when a secondary side series resonant circuit is combined with a voltage resonant converter of a single-ended type.

The switching frequency fs, the period TON, and the period TOFF in FIG. 20 indicate the switching operation of the power supply circuit shown in FIG. 17 as a characteristic of constant-voltage control dealing with load variation. In this case, the switching frequency fs is substantially constant with respect to load variation. On the other hand, the period TON and the period TOFF linearly change in manners opposite to each other as shown in FIG. 20. This indicates that the switching operation is controlled by holding the switching frequency (switching period) substantially constant while the direct-current output voltage Eo is varied, and changing a time ratio between the on period and the off period. Such control can be regarded as PWM (Pulse Width Modulation) control that changes the on period and the off period within one cycle. The power supply circuit shown in FIG. 17 stabilizes the direct-current output voltage Eo by this PWM control.

FIG. 21 schematically shows the constant-voltage control characteristic of the power supply circuit shown in FIG. 17 by relation between the switching frequency fs (kHz) and the direct-current output voltage Eo.

The power supply circuit shown in FIG. 17 has the primary side parallel resonant circuit and the secondary side series resonant circuit. Therefore the power supply circuit shown in FIG. 17 has, in a composite manner, two resonant impedance characteristics, that is, a resonant impedance characteristic corresponding to the primary side parallel resonance frequency fo1 of the primary side parallel resonant circuit and the secondary side series resonance frequency fo2 of the secondary side series resonant circuit. Since the power supply circuit shown in FIG. 17 has the relation fo1≈2.8×fo2, the secondary side series resonance frequency fo2 is lower than the primary side parallel resonance frequency fo1, as shown in FIG. 21.

As for constant-voltage control characteristics with respect to the switching frequency fs under a condition of a constant alternating input voltage VAC, as shown in FIG. 21, constant-voltage control characteristics at the maximum load power Pomax and the minimum load power Pomin under the resonant impedance corresponding to the primary side parallel resonance frequency fo1 of the primary side parallel resonant circuit are represented by a characteristic curve A and a characteristic curve B, respectively, and constant-voltage control characteristics at the maximum load power Pomax and the minimum load power Pomin under the resonant impedance corresponding to the secondary side series resonance frequency fo2 of the secondary side parallel resonant circuit are represented by a characteristic curve C and a characteristic curve D, respectively. When constant-voltage control is to be performed at tg, which is a rated level of the direct-current output voltage Eo, under the characteristics shown in FIG. 21, the variable range (necessary control range) of the switching frequency necessary for the constant-voltage control can be represented as a section denoted by Δfs.

The variable range Δfs shown in FIG. 21 extends from the characteristic curve C at the maximum load power Pomax which characteristic curve corresponds to the secondary side series resonance frequency fo2 of the secondary side series resonant circuit to the characteristic curve B at the minimum load power Pomin which characteristic curve corresponds to the primary side parallel resonance frequency fo1 of the primary side parallel resonant circuit. Crossed between the characteristic curve C at the maximum load power Pomax and the characteristic curve B at the minimum load power Pomin are the characteristic curve D at the minimum load power Pomin which characteristic curve corresponds to the secondary side series resonance frequency fo2 of the secondary side series resonant circuit and the characteristic curve A at the maximum load power Pomax which characteristic curve corresponds to the primary side parallel resonance frequency fo1 of the primary side parallel resonant circuit.

Thus, as the constant-voltage control operation of the power supply circuit shown in FIG. 17, switching-driving control is performed by PWM control that holds the switching frequency fs substantially fixed, and changes a time ratio (period TON/period TOFF) in one switching period. Incidentally, this is indicated by the fact that the period length of one switching period (TOFF+TON) shown at the times of the maximum load power Pomax=200 W, load power=100 W, and the minimum load power Pomin=0 W in FIGS. 19A, 19B, and 19C is substantially constant, while the widths of the period TOFF and the period TON are changed.

Such an operation is obtained by making a transition between a state in which the resonant impedance (capacitive impedance) at the primary side parallel resonance frequency fo1 of the primary side parallel resonant circuit is dominant and a state in which the resonant impedance (inductive impedance) at the secondary side series resonance frequency fo2 of the secondary side parallel resonant circuit is dominant, as resonant impedance characteristics according to load variation in the power supply circuit, in the narrow variable range Δfs of the switching frequency. (See Japanese Patent Laid-Open No. 2000-134925 as Patent Document 1)

The power supply circuit shown in FIG. 17 has the following problems.

The switching current IQ1 at the maximum load power Pomax shown in FIG. 19A is at a zero level until an end of the period TOFF as turn-on timing. When the period TON is reached, the switching current IQ1 operates such that a current of negative polarity first flows through the body diode DD1, and is then inverted to flow from the drain to the source of the switching element Q1. Such an operation indicates that ZVS (Zero Voltage Switching) is performed properly.

On the other hand, the switching current IQ1 at Po=120 W corresponding to an intermediate load which current is shown in FIG. 19B operates so as to flow as noise before the end of the period TOFF as turn-on timing is reached. This operation is an abnormal operation in which ZVS is not properly performed.

That is, it is known that a voltage resonant converter provided with a secondary side series resonant circuit as shown in FIG. 17 causes the abnormal operation in which ZVS is not properly performed at the time of the intermediate load. It is confirmed that the actual power supply circuit shown in FIG. 17 causes such an abnormal operation in a load variation range as a section A shown in FIG. 20, for example.

As described earlier, a voltage resonant converter provided with a secondary side series resonant circuit inherently has, as a tendency thereof, a characteristic of being able to maintain high efficiency in an excellent manner as the load is varied. However, as shown by the switching current IQ1 in FIG. 19B, a considerable peak current flows at the time of turning on the switching element Q1, thereby inviting an increase in switching loss and constituting a factor in lowering power conversion efficiency.

At any rate, an abnormal operation as described above causes a shift in phase-gain characteristics of a constant-voltage control circuit system, for example, thus resulting in a switching operation in a state of abnormal oscillation. Thus, in the present situation, it is generally recognized to be difficult to put the power supply circuit of FIG. 17 to practical use in actuality.

SUMMARY OF THE INVENTION

Accordingly, in view of the above-described problems, a switching power supply circuit according to an embodiment of the present invention is constituted as follows. The switching power supply circuit includes a primary side rectifying and smoothing circuit having a primary side rectifying element and a primary side smoothing capacitor, the primary side rectifying and smoothing circuit generating a rectified and smoothed voltage by rectifying and smoothing a commercial alternating-current power; a switching element that performs a switching operation to convert the rectified and smoothed voltage to an alternating voltage; a converter transformer having a primary winding on a primary side and a secondary winding on a secondary side, the primary winding being supplied with the alternating voltage and the secondary winding having an alternating voltage induced therein by the primary winding; a secondary side rectifying and smoothing circuit having a secondary side rectifying element and a secondary side smoothing capacitor, the secondary side rectifying and smoothing circuit generating an output direct-current voltage by rectifying and smoothing the alternating voltage induced in the secondary winding of the converter transformer; switching element controlling means for controlling the switching element based on the output direct-current voltage; a choke coil connected in series with the primary winding of the converter transformer; a primary side series resonant capacitor connected to a point of connection between the primary winding of the converter transformer and the choke coil; a primary side parallel resonant capacitor connected in parallel with the switching element; a series connection circuit of a clamping capacitor and an auxiliary switch element, the series connection circuit being connected in parallel with a series connection circuit of the choke coil and the primary winding of the converter transformer; and a secondary side series resonant capacitor connected in series with the secondary winding of the converter transformer; wherein a side of the primary winding in the series connection circuit of the choke coil and the primary winding of the converter transformer is connected to the switching element, a side of the choke coil in the series connection circuit of the choke coil and the primary winding of the converter transformer is connected to the primary side rectifying and smoothing circuit, a first primary side series resonant circuit is formed having a resonance frequency governed by inductance of the choke coil and a capacitance of the primary side series resonant capacitor, a second primary side series resonant circuit is formed having a resonance frequency governed by a leakage inductance occurring in the primary winding of the converter transformer and the capacitance of the primary side series resonant capacitor, a secondary side series resonant circuit is formed having a resonance frequency governed by a leakage inductance occurring in the secondary winding of the converter transformer and a capacitance of the secondary side series resonant capacitor, the resonance frequency of the first primary side series resonant circuit, the resonance frequency of the second primary side series resonant circuit, and the resonance frequency of the secondary side series resonant circuit are set substantially equal to each other, and the auxiliary switch element conducts when the switching element is not conducting.

The switching power supply circuit thus constituted includes a primary side rectifying and smoothing circuit having a primary side rectifying element and a primary side smoothing capacitor, the primary side rectifying and smoothing circuit generating a rectified and smoothed voltage by rectifying and smoothing a commercial alternating-current power; a switching element that performs a switching operation to convert the rectified and smoothed voltage to an alternating voltage; a converter transformer having a primary winding on a primary side and a secondary winding on a secondary side, the primary winding being supplied with the alternating voltage and inducing an alternating voltage in the secondary winding; a secondary side rectifying and smoothing circuit having a secondary side rectifying element and a secondary side smoothing capacitor, the secondary side rectifying and smoothing circuit generating an output direct-current voltage by rectifying and smoothing the alternating voltage induced in the secondary winding; and switching element controlling means for controlling the switching element based on the output direct-current voltage. Therefore, the alternating-current power is converted to direct-current power, which is converted to alternating-current power by the switching element controlled by the switching element controlling means, and a predetermined voltage can be obtained on the secondary side of the converter transformer.

The switching power supply circuit further includes a choke coil connected in series with the primary winding of the converter transformer; a primary side series resonant capacitor connected to a point of connection between the primary winding of the converter transformer and the choke coil; a series connection circuit of a clamping capacitor and an auxiliary switch element, the series connection circuit being connected in parallel with a series connection circuit of the choke coil and the primary winding of the converter transformer; and a secondary side series resonant capacitor connected in series with the secondary winding of the converter transformer.

A side of the primary winding in the series connection circuit of the choke coil and the primary winding of the converter transformer is connected to the switching element, a side of the choke coil in the series connection circuit of the choke coil and the primary winding of the converter transformer is connected to the primary side rectifying and smoothing circuit, a first primary side series resonant circuit is formed having a resonance frequency governed by an inductance of the choke coil and a capacitance of the primary side series resonant capacitor, a second primary side series resonant circuit is formed having a resonance frequency governed by a leakage inductance occurring in the primary winding of the converter transformer and the capacitance of the primary side series resonant capacitor, and a secondary side series resonant circuit is formed having a resonance frequency governed by a leakage inductance occurring in the secondary winding of the converter transformer and capacitance of the secondary side series resonant capacitor, the resonance frequency of the first primary side series resonant circuit, the resonance frequency of the second primary side series resonant circuit, and the resonance frequency of the secondary side series resonant circuit are set substantially equal to each other. Therefore, a variable frequency range of the switching frequency of the switching element can be narrowed.

In addition, the auxiliary switch element conducts when the switching element is not conducting. Therefore, a voltage applied to the switching element can be clamped.

Thus, the switching power supply circuit having the series resonant circuit on the secondary side according to the embodiment of the present invention eliminates the abnormal operation in which ZVS (Zero Voltage Switching) operation is not obtained in a load condition range of intermediate load.

In addition, since the current flowing from the smoothing capacitor of the rectifying and smoothing circuit generating the rectified and smoothed voltage (direct-current input voltage) from the commercial alternating-current power into the switching converter is a direct current, a small value is selected for the capacitance of a part element as the smoothing capacitor, and a general-purpose product can be selected. Thus, effects of reducing cost and decreasing size of the smoothing capacitor, for example, are obtained.

In addition, a characteristic of total power conversion efficiency can be improved greatly by reducing a power loss according to a reduction in the amount of current flowing within the power supply circuit. Further, the voltage of the switching element is clamped by the series circuit of the clamping capacitor and the auxiliary switch element, so that the withstand voltage of the switching element can be lowered.

DETAILED DESCRIPTION

Prior to description of the best mode for carrying out the present invention (hereinafter referred to as an embodiment), a fundamental configuration of a switching converter that performs switching operation by class E resonance (hereinafter referred to also as a class E switching converter) as background art of the present embodiment will be described with reference to FIG. 1 and FIG. 2.

Figure 1:
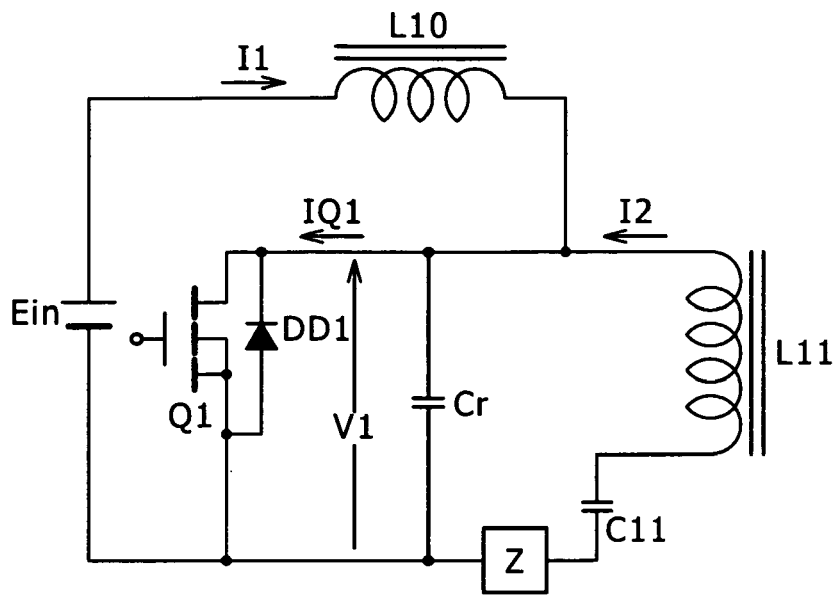
FIG. 1 is a circuit diagram showing an example of fundamental configuration of a class E switching converter.

FIG. 1 shows the fundamental configuration of the class E switching converter. The class E switching converter shown in FIG. 1 employs a configuration of a DC-to-AC inverter operating as a class E resonance type.

The class E switching converter shown in FIG. 1 has one switching element Q1. The switching element Q1 in this case is a MOSFET. A body diode DD1 is formed in such a manner as to be connected in parallel with the drain and source of the switching element Q1 as the MOSFET. The forward direction of the body diode DD1 in this case is a direction from the source to the drain.

A primary side parallel resonant capacitor Cr is connected in parallel with the same drain and source of the switching element Q1. The drain of the switching element Q1 is also connected to the positive electrode of a direct-current power source Ein via a series connection of a choke coil PCC (inductor L10). The source of the switching element Q1 is connected to the negative electrode of the direct-current input voltage source Ei. In addition, the drain of the switching element Q1 is connected with one terminal of a choke coil L11. A primary side series resonant capacitor C11 is connected in series with another terminal of the choke coil L11. An impedance Z as a load is inserted between the primary side series resonant capacitor C11 and the negative electrode of the direct-current power source Ein. Concrete examples of the impedance Z in this case include a piezoelectric transformer, a fluorescent light ready for high frequencies, and the like.

The class E switching converter having such a configuration can be considered to be one form of a complex resonant converter having a parallel resonant circuit formed by the inductance of the choke coil L10 and the capacitance of the primary side parallel resonant capacitor Cr and a series resonant circuit formed by the inductance of the choke coil L11 and the capacitance of the primary side series resonant capacitor C11. Also, the class E switching converter having such a configuration can be said to be the same as a voltage resonant converter of a single-ended type in that the switching converter has only one switching element.

Figure 2:
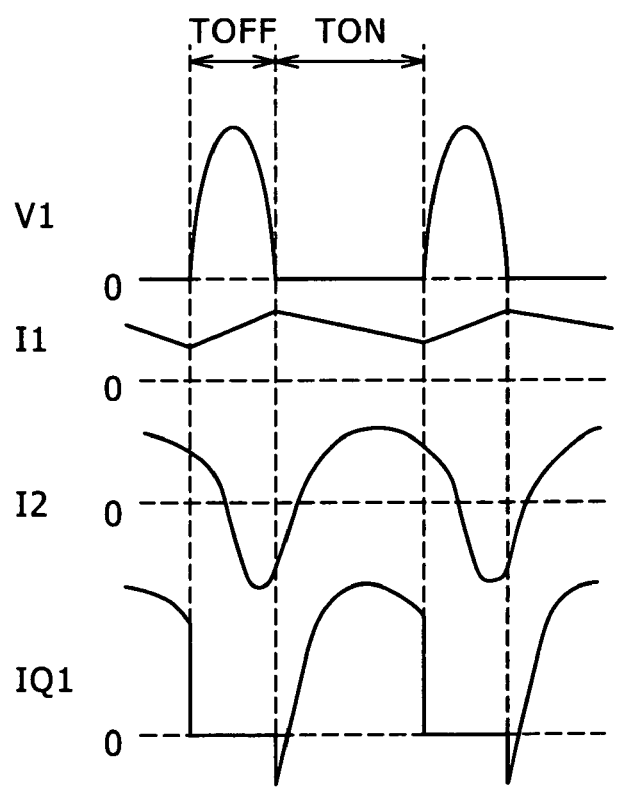
FIG. 2 is a waveform chart showing operation of the class E switching converter.

FIG. 2 shows operation of principal parts of the class E switching converter having the configuration shown in FIG. 1.

A switching voltage V1 is obtained across the switching element Q1. The switching voltage V1 is at a zero level during a period TON during which the switching element Q1 is on, and forms a sinusoidal pulse during a period TOFF during which the switching element Q1 is off. This switching pulse waveform is obtained by the resonant operation (voltage resonant operation) of the above parallel resonant circuit.

A switching current IQ1 flows through the switching element Q1 (and the body diode DD1). The switching current IQ1 is at a zero level during the period TOFF. For a certain period from a start of the period TON, the switching current IQ1 flows through the body diode DD1, and is therefore of negative polarity. Thereafter the switching current IQ1 is inverted to be of positive polarity, and flows from the drain to the source of the switching element Q1. A current I2 flowing through the above-described series resonant circuit as an output of the class E switching converter is obtained by combining the switching current IQ1 flowing through the switching element Q1 (and the body diode DD1) and a current flowing through the primary side parallel resonant capacitor Cr. The current I2 has a waveform including a sinusoidal wave component. A relation between the switching current IQ1 and the switching voltage V1 indicates that ZVS operation is obtained in timing of turning off the switching element Q1, and that ZVS and ZCS operation is obtained in timing of turning on the switching element Q1.

Since the value of inductance of the choke coil L10 is set higher than the value of inductance of the choke coil L11, an input current I1 flowing into the class E switching converter so as to flow from the positive electrode terminal of the direct-current power source Ein through the choke coil L10 has a pulsating current waveform having a predetermined average level as shown in FIG. 2. Such a pulsating current waveform can be considered to be approximate to a direct current.

The present inventor applied the class E switching converter based on the above-described fundamental configuration to form a power supply circuit, and conducted experiments on the power supply circuit. An example of configuration of the power supply circuit is shown in a circuit diagram of FIG. 3.

Figure 3:
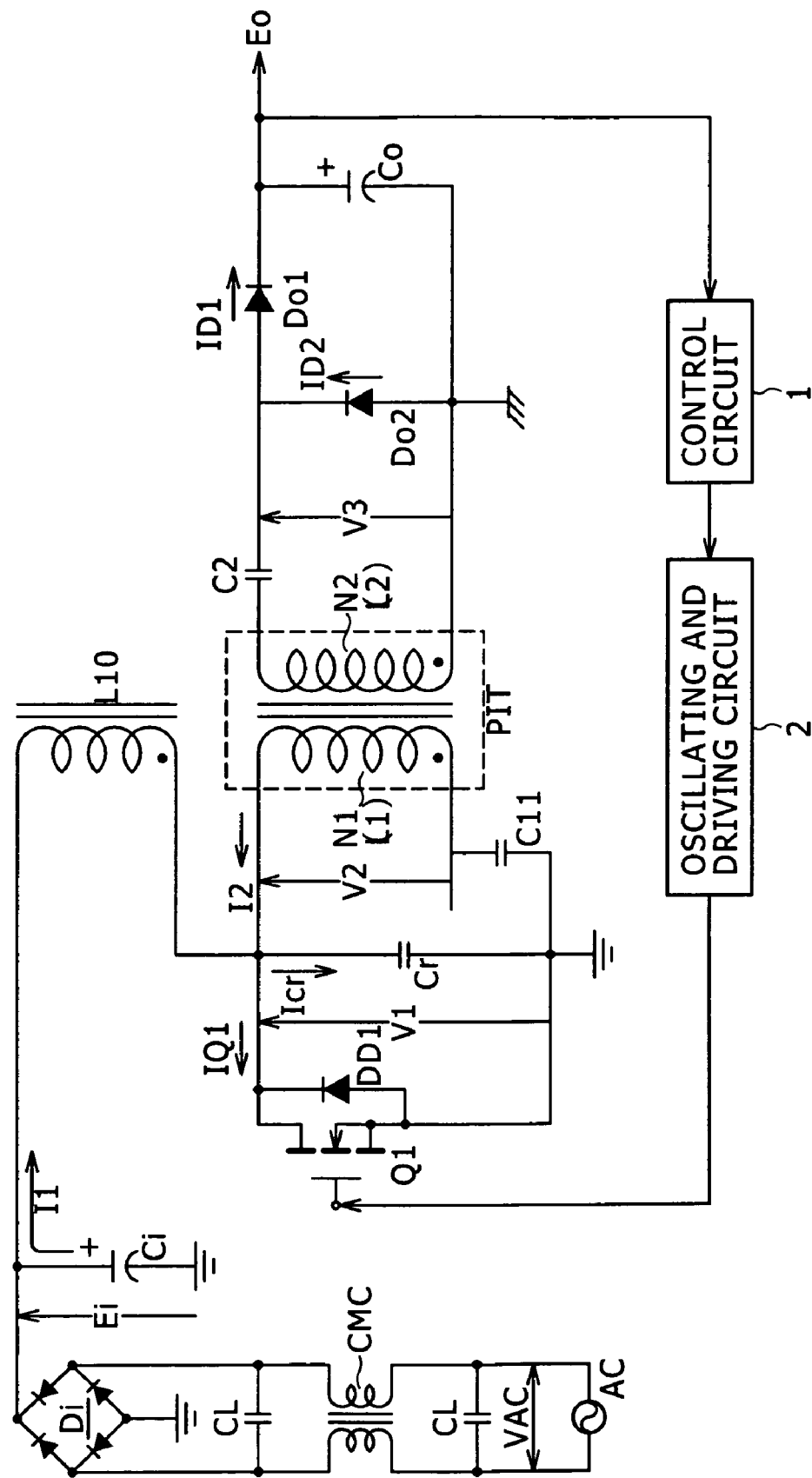
FIG. 3 is a circuit diagram showing an example of configuration of a switching power supply circuit to which the class E switching converter is applied.

In the switching power supply circuit shown in FIG. 3, one pair of common mode choke coils CMC and two across capacitors CL are inserted into the line of a commercial alternating-current power supply AC as shown in the figure. The common mode choke coils CMC and the across capacitors CL form a noise filter that eliminates common mode noise superimposed on the line of the commercial alternating-current power supply AC.

Alternating-current power from the commercial alternating-current power supply AC is rectified by a bridge rectifier circuit Di, and a smoothing capacitor Ci is charged with the rectified output. That is, a rectifying and smoothing circuit formed by the bridge rectifier circuit Di and the smoothing capacitor Ci rectifies and smoothes the alternating-current power to thereby convert the alternating-current power into direct-current power. Thereby a direct-current input voltage Ei is obtained as a voltage across the smoothing capacitor Ci. The direct-current input voltage Ei is supplied to a switching converter in a subsequent stage.

In FIG. 3, the switching converter supplied with the direct-current input voltage Ei and performing switching operation is formed as the class E switching converter based on the fundamental configuration of FIG. 1. A high withstand voltage MOSFET is selected as a switching element Q1 in this case. A system for driving the class E switching converter in this case is an externally exciting method in which the switching element is switching-driven by an oscillating and driving circuit 2.

The drain of the switching element Q1 is connected to the positive electrode terminal of the smoothing capacitor Ci via a series connection of a choke coil PCC (inductor L10). Thus, in this case, the direct-current input voltage Ei is supplied to the drain of the switching element Q1 and one winding end of a primary winding N1 of an isolated converter transformer PIT via the series connection of the choke coil PCC (inductor L10). The source of the switching element Q1 is connected to a primary side ground. An inductor L10 formed by the choke coil winding N10 is a functional part corresponding to the choke coil PCC (inductor L10) in the class E switching converter shown in FIG. 1.

A switching driving signal (voltage) output from the oscillating and driving circuit 2 is applied to the gate of the switching element Q1. Since a MOSFET is selected as the switching element Q1 in this case, the switching element Q1 includes a body diode DD1 connected in parallel with the source and the drain of the switching element Q1, as shown in FIG. 3. The body diode DD1 has an anode connected to the source of the switching element Q1, and a cathode connected to the drain of the switching element Q1. The body diode DD1 forms a path for passing a switching current in an opposite direction which current is caused by the ON/OFF operation of the switching element Q1 (ON denotes conduction and OFF denotes non-conduction, and the ON/OFF operation is a switching operation in which ON and OFF are alternately repeated).

A primary side parallel resonant capacitor Cr is connected in parallel with the drain and the source of the switching element Q1. The capacitance of the primary side parallel resonant capacitor Cr and the leakage inductance of a leakage inductor L1 formed by the primary winding N1 of the isolated converter transformer PIT form a primary side parallel resonant circuit (voltage resonant circuit) for the switching current flowing through the switching element Q1. Incidentally, supposing that the value of inductance of the choke coil PCC (inductor L10) is higher than the value of inductance of the leakage inductor L1, the above-described primary side parallel resonant circuit does not include the choke coil PCC (inductor L10). However, a contribution of the choke coil PCC (inductor L10) to the primary side parallel resonant circuit needs to be considered when the resonance frequency of a resonant circuit formed by the choke coil PCC (inductor L10), the smoothing capacitor Ci, and the primary side parallel resonant capacitor Cr is close to the resonance frequency of the resonant circuit formed by the primary side parallel resonant capacitor Cr and the leakage inductor L1 in a case where the value of inductance of the choke coil PCC (inductor L10) is close to the value of inductance of the leakage inductor L1, in a case where the value of a primary side series resonant capacitor C11 to be described later is close to the value of the primary side parallel resonant capacitor Cr, and in a case where the value of capacitance of the smoothing capacitor Ci is close to the value of the primary side parallel resonant capacitor Cr, for example. The primary side parallel resonant circuit performs resonant operation, whereby an operation of a voltage resonant type is obtained for one thing as switching operation of the switching element Q1. Accordingly, during the off period of the switching element Q1, a sinusoidal resonant pulse waveform is obtained as the switching voltage V1, which is a voltage between the drain and the source of the switching element Q1.

A series connection circuit formed by the primary winding N1 of the isolated converter transformer PIT to be described later and the primary side series resonant capacitor C11 is connected in parallel with the drain and the source of the switching element Q1. In this case, one winding end (for example a winding terminating end part) of the primary winding N1 is connected to the drain of the switching element Q1, and another winding end (for example a winding starting end part) of the primary winding N1 is connected to the primary side series resonant capacitor C11. An electrode terminal of the primary side series resonant capacitor C11 which terminal is not connected to the primary winding N1 is connected to the source of the switching element Q1 at a primary side ground potential.

In order to drive the switching element Q1 by the externally exciting method, the oscillating and driving circuit 2 generates a driving signal as a gate voltage for switching-driving the MOSFET on the basis of an oscillating signal obtained by an oscillating circuit, and then applies the driving signal to the gate of the switching element Q1. Thereby the switching element Q1 successively performs on/off operation according to the waveform of the driving signal. That is, the switching element Q1 performs switching operation.

The isolated converter transformer PIT transmits the switching output of the primary side switching converter to a secondary side with the primary side and the secondary side insulated from each other in terms of direct current. For this, the primary winding N1 and a secondary winding N2 are wound.

The structure of the isolated converter transformer PIT in this case has for example an EE-shaped core formed by combining E-type cores of ferrite material with each other. A winding part is divided into a primary side winding part and a secondary side winding part. The primary winding N1 and the secondary winding N2 are wound around the part of a central magnetic leg of the EE-shaped core.

In addition, a gap of about 1.6 mm is formed in the central magnetic leg of the EE-shaped core of the isolated converter transformer PIT. Thereby a coupling coefficient k=about 0.75 is obtained between the primary side and the secondary side. The coupling coefficient k at this level represents a degree of coupling generally rated as loose coupling, and correspondingly the isolated converter transformer PIT is not easily saturated.

The primary winding N1 of the isolated converter transformer PIT is an element for forming a primary side series resonant circuit in the class E switching converter formed on the primary side, as will be described later. The primary winding N1 of the isolated converter transformer PIT obtains an alternating output according to the switching output of the switching element Q1.

An alternating voltage induced by the primary winding N1 occurs in the secondary winding N2 on the secondary side of the isolated converter transformer PIT. A secondary side series resonant capacitor C2 is connected in series with the secondary winding N2. Thus, a leakage inductor L2 of the secondary winding N2 and the capacitance of the secondary side series resonant capacitor C2 form a secondary side series resonant circuit. This secondary side series resonant circuit performs resonant operation according to the rectifying operation of a secondary side rectifier circuit to be described later. Thereby a secondary winding current flowing through the secondary winding N2 becomes sinusoidal. That is, a current resonant operation is obtained on the secondary side.

The secondary side rectifier circuit in this case is formed as a voltage doubler half-wave rectifier circuit by connecting two rectifier diodes Do1 and Do2 and one smoothing capacitor Co to the secondary winding N2 connected in series with the secondary side series resonant capacitor C2 as described above. As for a mode of connection of this voltage doubler half-wave rectifier circuit, the anode of the rectifier diode Do1 and the cathode of the rectifier diode Do2 are connected to the winding terminating end part of the secondary winding N2 via the secondary side series resonant capacitor C2. The cathode of the rectifier diode Do1 is connected to the positive electrode terminal of the smoothing capacitor Co. The winding starting end part of the secondary winding N2 and the anode of the rectifier diode Do2 are connected to the negative electrode terminal of the smoothing capacitor Co at a secondary side ground potential.

The rectifying operation of the thus formed voltage doubler half-wave rectifier circuit is as follows. First, during a half period corresponding to one polarity of a voltage across the secondary winding N2 (secondary winding voltage) as the alternating voltage induced in the secondary winding N2, a forward-direction voltage is applied to the rectifier diode Do2, and the rectifier diode Do2 conducts to charge the secondary side series resonant capacitor C2 with a rectified current. Thereby a voltage having a level corresponding to once the level of the alternating voltage induced in the secondary winding N2 is generated across the secondary side series resonant capacitor C2. During a next half period corresponding to another polarity of the secondary winding voltage V3, a forward-direction voltage is applied to the rectifier diode Do2, and the rectifier diode Do2 conducts. At this time, the smoothing capacitor Co is charged with a potential obtained by superimposing the potential of the secondary winding voltage V3 on the voltage across the secondary side series resonant capacitor C2.

Thereby a direct-current output voltage Eo having a level corresponding to twice the level of the alternating voltage induced in the secondary winding N2 is obtained as a voltage across the smoothing capacitor Co. In this rectifying operation, the smoothing capacitor Co is charged only during one period of the alternating voltage induced in the secondary winding N2. That is, a voltage doubler half-wave rectifying operation is obtained. Such a rectifying operation can be considered to be a rectifying operation performed on the resonance output of the secondary side series resonant circuit formed by a series connection of the secondary winding N2 and the secondary side series resonant capacitor C2. The thus generated direct-current output voltage Eo is supplied to a load. The direct-current output voltage Eo also branches off to be output as a detection voltage to a control circuit 1.

The control circuit 1 supplies a detection output corresponding to a change in level of the input direct-current output voltage Eo to the oscillating and driving circuit 2. The oscillating and driving circuit 2 drives the switching element Q1 so as to vary switching frequency according to the input detection output of the control circuit 1 and, with this, also vary a time ratio (conduction angle) between the period TON and the period TOFF in one switching period. This operation is a constant-voltage control operation on the secondary side direct-current output voltage.

Variably controlling the switching frequency and the conduction angle of the switching element Q1 as described above changes primary side and secondary side resonant impedance in the power supply circuit and a power transmission effective period, and changes an amount of power transmitted from the primary winding N1 to the secondary winding N2 of the isolated converter transformer PIT and an amount of power to be supplied from the secondary side rectifier circuit to the load. Thereby an operation of controlling the level of the direct-current output voltage Eo so as to cancel variations in level of the direct-current output voltage Eo is obtained. That is, the direct-current output voltage Eo is stabilized.

When the switching converter (Q1 Cr, L10, N1, and C11) formed as described above on the primary side of the power supply circuit of FIG. 3 is compared with the circuit configuration of the class E converter shown in FIG. 1, the switching converter in FIG. 3 can be considered to be formed by omitting the impedance Z as a load from the circuit of FIG. 1 and replacing the winding of the choke coil L11 with the primary winding N1 (leakage inductor L1) of the isolated converter transformer PIT. In the primary side switching converter in FIG. 3, the inductance of the choke coil PCC (inductor L10) and the capacitance of the primary side parallel resonant capacitor Cr form a primary side parallel resonant circuit, and the leakage inductor L1 of the primary winding N1 of the isolated converter transformer PIT and the capacitance of the primary side series resonant capacitor C11 form a primary side series resonant circuit.

It can be said from this that the primary side switching converter in FIG. 3 is formed as a class E switching converter performing a class E resonance type switching operation. A switching output (alternating output) obtained by the switching operation of the primary side switching converter is transmitted from the primary winding N1 corresponding to the choke coil L11 to the secondary winding N2 via a magnetic coupling of the isolated converter transformer PIT. Then, on the secondary side, rectification is, performed to obtain the direct-current output voltage Eo.

That is, the power supply circuit shown in FIG. 3 is formed as a DC-to-DC converter having a class E switching converter on the primary side.

In addition, the thus formed primary side class E switching converter can also be considered to be a complex resonant converter, or the configuration of a soft switching power supply, in which a series connection circuit of the primary winding N1 and the primary side series resonant capacitor C11 forming the primary side series resonant circuit is connected to a voltage resonant converter formed by the choke coil PCC (inductor L10) or the leakage inductor L1, or the choke coil PCC (inductor L10) and the leakage inductor L1, the primary side parallel resonant capacitor Cr, and the switching element Q1 (and the body diode DD1). In the above sentence, "the choke coil PCC (inductor L10) or the leakage inductor L1, or the choke coil PCC (inductor L10) and the leakage inductor L1" indicates that the value of the choke coil PCC (inductor L10) does not need to be taken into consideration when the value of inductance of the choke coil PCC (inductor L10) is much higher than the value of inductance of the leakage inductor L1, and that both the value of inductance of the choke coil PCC (inductor L10) and the value of inductance of the leakage inductor L1 need to be taken into consideration when the value of inductance of the choke coil PCC (inductor L10) and the value of inductance of the leakage inductor L1 become close to each other.

Figure 17:
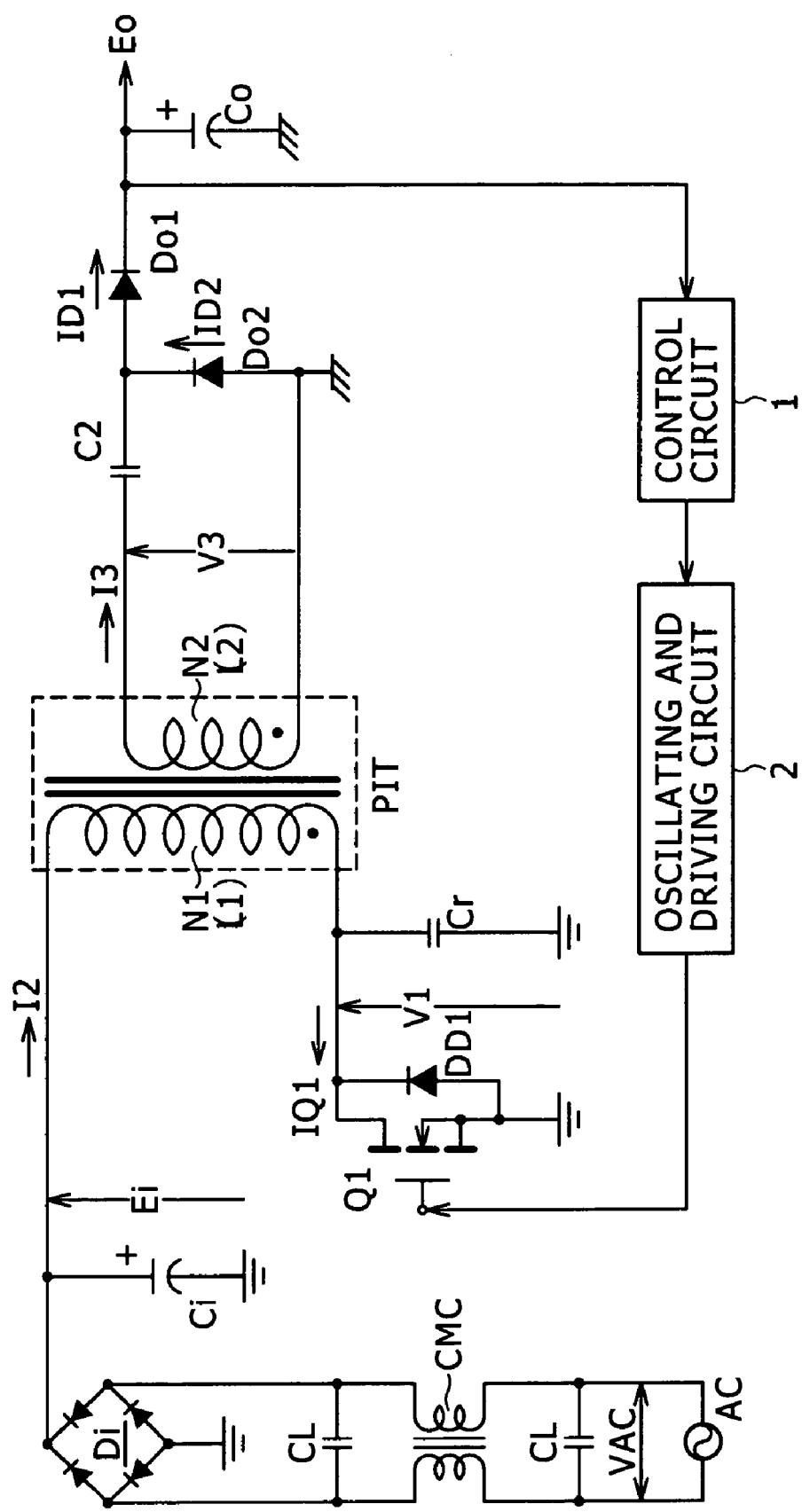
FIG. 17 is a circuit diagram showing an example of configuration of a switching power supply circuit as background art.
Figure 18:
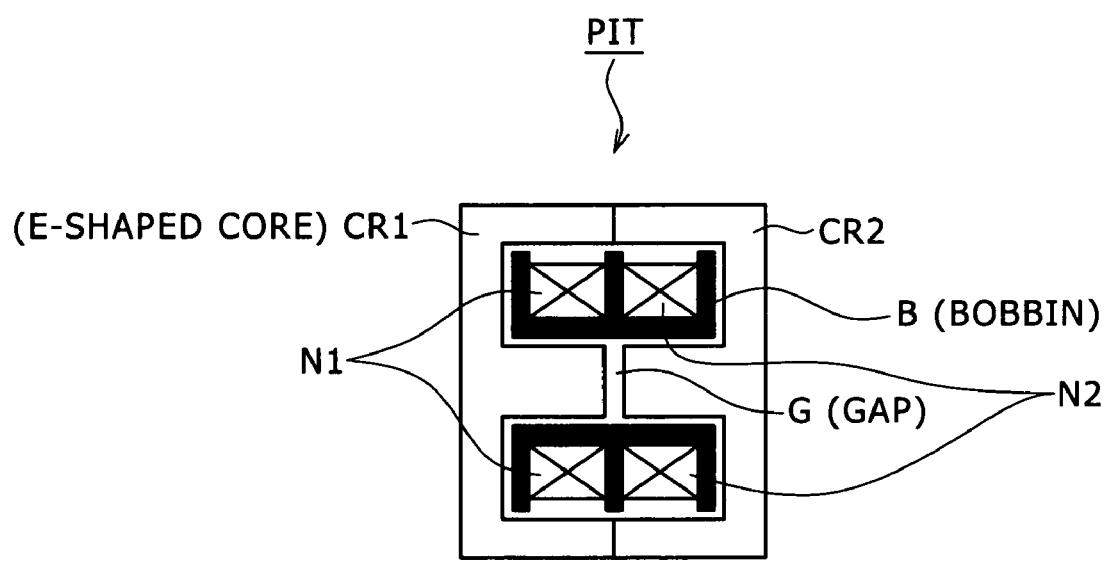
FIG. 18 is a diagram showing an example of structure of an isolated converter transformer of the background art.

It is generally considered that the power supply circuit having a voltage resonant converter on the primary side cannot be put to practical use as it is because the power supply circuit has a narrow load power control range and cannot maintain ZVS at light load. Accordingly, when a power supply circuit was constructed by providing a secondary side series resonant circuit to a primary side voltage resonant converter as shown in FIG. 17 as a conventional example and forming a voltage doubler half-wave rectifier circuit as a secondary side rectifier circuit, and an experiment was conducted by the present inventor, characteristics that made the practical use nearer than power supply circuits having a voltage resonant converter before that time were obtained.

Figure 19C:
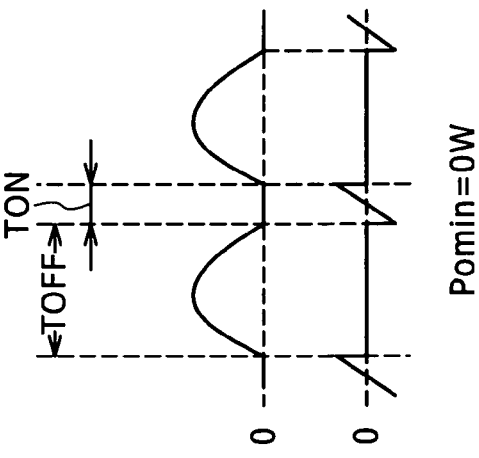
FIGS. 19A, 19B, and 19C are waveform charts showing the operations of principal parts in the power supply circuit shown as background art.
Figure 19B:
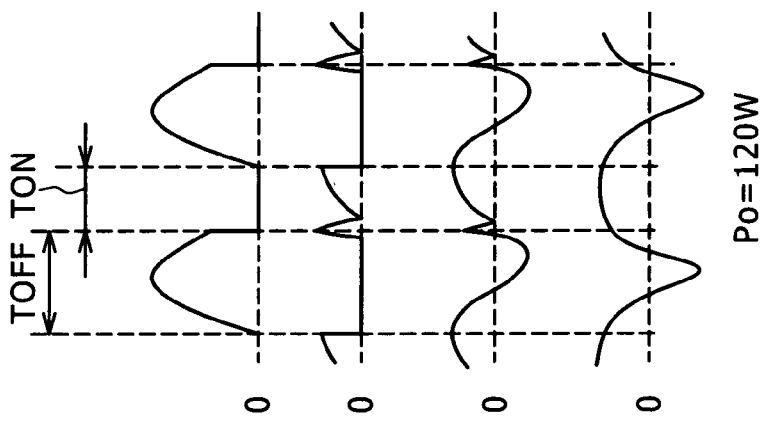

However, the power supply circuit of FIG. 17 causes an abnormal operation in which as described with reference to FIG. 19B, at intermediate load, a current flows through the switching element Q1 in a positive electrode direction (from the drain to the source in this case) before an end of the off period (TOFF) of the switching element Q1, so that ZVS operation is not obtained. Therefore it is still difficult to put the configuration of the power supply circuit of FIG. 17 to practical use.

The power supply circuit described with reference to FIG. 3 can be said to employ a configuration common with the conventional power supply circuit of FIG. 17 in that the power supply circuit described with reference to FIG. 3 is a complex resonant converter having the circuit form of a voltage resonant converter on the primary side, as described above.

However, when an experiment was conducted on the power supply circuit of FIG. 3, it was confirmed that the abnormal operation in which ZVS is not obtained at a time of intermediate load is eliminated, and that normal switching operation is obtained in the entire range of predetermined handled load power.

It has been confirmed that the abnormal operation of the power supply circuit shown in FIG. 17 at a time of intermediate load tends to occur when a complex resonant converter having a voltage resonant converter and a secondary side series resonant circuit is formed. A main cause for this is an interaction caused by simultaneous operation of the primary side parallel resonant circuit forming the voltage resonant converter and the secondary side series resonant circuit (rectifier circuit). That is, the very cause of the above-described abnormal operation at a time of intermediate load can be considered to be the circuit configuration in which the primary side voltage resonant converter and the secondary side series resonant circuit are combined with each other. On the basis of this, the power supply circuit shown in FIG. 3 has a configuration to which a class E switching converter is applied as a primary side switching converter in place of the voltage resonant converter.

Because of such a configuration, the power supply circuit of FIG. 3 eliminates the abnormal operation in which ZVS is not obtained at a time of intermediate load irrespective of whether a series resonant circuit is provided on the secondary side or not.

Thus, the power supply circuit of FIG. 3 eliminates the abnormal operation, which is a problem in the power supply circuit of FIG. 17 as a conventional example.

However, in a case where such a class E converter is combined with a multiple resonant converter, the peak value of a switching voltage V1 as a voltage resonance pulse voltage generated during the off period of a switching element Q1 reaches as high as 1600 V when the value of an input alternating voltage VAC as input alternating voltage is 264 V, and the withstand voltage of the switching element Q1 needs to be about 1800 V including a margin.

Accordingly, as the present embodiment, a configuration is proposed in which a class E switching converter is applied to a power supply circuit as a further advance on the power supply circuit shown in FIG. 3, whereby the abnormal operation at a time of intermediate load is eliminated and the withstand voltage of the switching element Q1 is allowed to be low.

First Embodiment

Figure 4:
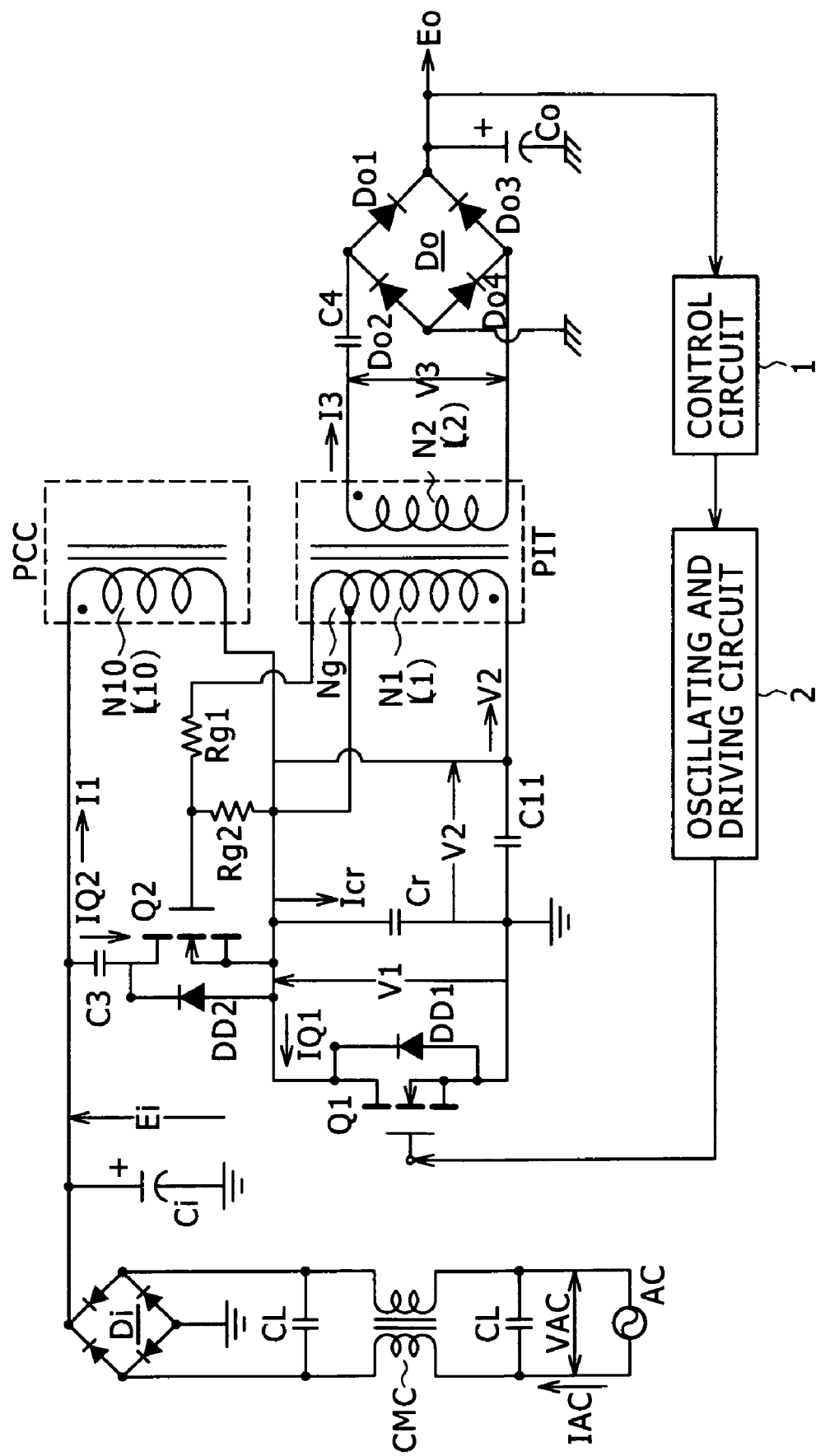
FIG. 4 is a circuit diagram showing an example of configuration of a power supply circuit according to an embodiment.

An example of configuration of a power supply circuit according to a first embodiment as such a power supply circuit is shown in FIG. 4. Incidentally, in FIG. 4, the same parts as in FIG. 3 are identified by the same reference numerals, and description thereof will be omitted.

The power supply circuit shown in FIG. 4 realizes class E switching operation with a choke coil PCC (inductor L10) having a choke coil winding N10 added to the primary side of a voltage resonant converter. In this case, a coupling coefficient between a primary winding N1 and a secondary winding N2 of an isolated converter transformer PIT is 0.8 or lower, which represents loose coupling. On the secondary side, a secondary side series resonant capacitor C4 is connected in series with the secondary winding N2, and a multiple resonant converter that obtains a direct-current output voltage from a full-wave bridge is formed. Further, a series connection circuit of a clamping capacitor C3 and an auxiliary switch element Q2 is connected in parallel with a series connection circuit of the choke coil PCC (inductor L10) of the multiple resonant converter and the isolated converter transformer PIT.

An isolated converter transformer auxiliary winding Ng as a primary winding of the isolated converter transformer PIT, a resistance Rg1, and a resistance Rg2 are provided to control the gate of the auxiliary switch element Q2.

Both the switching element Q1 of the multiple resonant converter part and the auxiliary switch element Q2 may be any of a MOSFET, an IGBT, and a BJT. However, description in the following will be made of a case where a MOSFET is used.

Main parts of the power supply circuit shown in FIG. 4 are connected as follows. The primary winding N1 of the isolated converter transformer PIT and the choke coil PCC are connected in series with each other. A primary side series resonant capacitor C11 is connected to a point of connection between the primary winding N1 of the isolated converter transformer PIT and the choke coil PCC. A series circuit of the clamping capacitor C3 and the auxiliary switch element Q2 is connected in parallel with the series connection circuit of the choke coil PCC and the primary winding N1 of the isolated converter transformer PIT. A primary winding side (a point of connection between the isolated converter transformer auxiliary winding Ng and the primary winding N1 in FIG. 4) of the series connection circuit of the choke coil PCC and the primary winding N1 of the isolated converter transformer PIT is connected to a switching element Q1. A choke coil PCC side (a side to which the clamping capacitor C3 is connected in FIG. 4) of the series connection circuit of the choke coil PCC and the primary winding N1 of the isolated converter transformer PIT is connected to a primary side rectifying and smoothing circuit.

A first primary side series resonant circuit having resonance frequency governed by the inductance of the inductor L10 of the choke coil PCC and the primary side series resonant capacitor C11 is formed. A second primary side series resonant circuit having resonance frequency governed by the inductance of a leakage inductor L1 occurring in the primary winding N1 of the isolated converter transformer PIT and the primary side series resonant capacitor C11 is formed. The resonance frequency of the first primary side series resonant circuit and the resonance frequency of the second primary side series resonant circuit are set substantially equal to each other.

Further, the isolated converter transformer auxiliary winding Ng is provided. A voltage from the isolated converter transformer auxiliary winding Ng is divided by the resistance Rg1 and the resistance Rg2, and then applied to the gate of a MOSFET functioning as the auxiliary switch element Q2. The clamping capacitor C3 is connected to the drain of the auxiliary switch element Q2. That is, the clamping capacitor C3 and the auxiliary switch element Q2 form a series connection circuit. The series connection circuit of the clamping capacitor and the auxiliary switch element Q2 is connected in parallel with the series connection circuit of the choke coil PCC (inductor L10) and the primary winding N1 of the isolated converter transformer.

Incidentally, the isolated converter transformer auxiliary winding Ng is wound so as to be stacked from the primary winding N1. However, the isolated converter transformer auxiliary winding Ng is connected so as to be stacked because the source of the MOSFET functioning as the auxiliary switch element Q2 is connected to one terminal of the primary winding N1, and therefore there is no problem when the isolated converter transformer auxiliary winding Ng is provided as a separate winding. In the circuit form as described above, a voltage generated by the isolated converter transformer auxiliary winding Ng has polarity such that the auxiliary switch element Q2 is on (conduction) when the switching element Q1 is off (non-conduction). A time during which the auxiliary switch element Q2 is on (conduction) can be adjusted by changing a ratio between the resistance values of the resistance Rg1 and the resistance Rg2. The auxiliary switch element Q2 includes a body diode DD2. Thus the auxiliary switch element Q2 enables on/off switching control for a current in one direction, and has an on state for a current in another direction. The auxiliary switch element Q2 therefore can pass currents in both directions.

According to the switching operation of the switching element Q1, the voltage resonant operation of a primary side parallel resonant circuit makes charging and discharging current flow through a primary side parallel resonant capacitor Cr during the period when the switching element Q1 is off. The primary side series resonant circuits perform resonant operation such that resonance current flows through a path from the primary side series resonant capacitor C11 through the primary winding N1 to the switching element Q1 and a path from the primary side series resonant capacitor C11 through the choke coil winding N10 to the switching element Q1 during the on period of the switching element Q1.

In the present embodiment, the resonance frequency being "governed" refers to the resonance frequency being determined mainly by these factors. For example, the first primary side series resonant circuit has not only the inductor L10 and the primary side series resonant capacitor C11 but also a smoothing capacitor Ci as components. However, the value of capacitance of the smoothing capacitor Ci is very large as compared with the value of capacitance of the primary side series resonant capacitor C11. Thus the value of the resonance frequency of the first primary side series resonant circuit being highly dependent on the value of inductance of the inductor L10 occurring in the primary winding N1 and the value of the primary side series resonant capacitor C11 and being hardly dependent on the value of capacitance of the smoothing capacitor Ci corresponds to the resonance frequency being "governed". As another example, the primary side parallel resonant circuit having a resonance frequency determined by the primary side series resonant capacitor C11, the primary side parallel resonant capacitor Cr, and the leakage inductor L1, the primary side parallel resonance frequency being hardly dependent on the value of capacitance of the primary side series resonant capacitor C11 when the value of capacitance of the primary side series resonant capacitor C11 is very small as compared with the value of capacitance of the primary side parallel resonant capacitor Cr corresponds to the primary side parallel resonance frequency being "governed" by the primary side parallel resonant capacitor Cr and the leakage inductor L1.

As for the secondary side, the isolated converter transformer PIT has the secondary winding N2, and as with the primary winding N1, the secondary winding N2 has a leakage inductor L2 because of the loose coupling of the isolated converter transformer. A secondary side series resonant circuit having resonance frequency governed by the leakage inductor L2 occurring in the secondary winding N2 of the isolated converter transformer PIT and the secondary side series resonant capacitor C4 is formed.

The secondary side series resonant circuit and a secondary side rectifying and smoothing circuit are connected in series with each other. The secondary side rectifying and smoothing circuit has a secondary side rectifying element and a secondary side smoothing capacitor. The secondary side rectifying element is formed by a bridge connection of rectifier diodes Do1 to Do4 having an input side and an output side. A point of connection between the rectifier diode Do1 and the rectifier diode Do2 and a point of connection between the rectifier diode Do3 and the rectifier diode Do4 are set as the input side. A point of connection between the rectifier diode Do1 and the rectifier diode Do3 and a point of connection between the rectifier diode Do2 and the rectifier diode Do4 are set as the output side. The smoothing capacitor Co is connected to the output side of the bridge connection. Such a secondary side rectifying and smoothing circuit is a full-wave rectifier circuit that rectifies both a positive voltage and a negative voltage generated in the secondary winding N2 and then uses the rectified voltages as load power.

Figure 5:
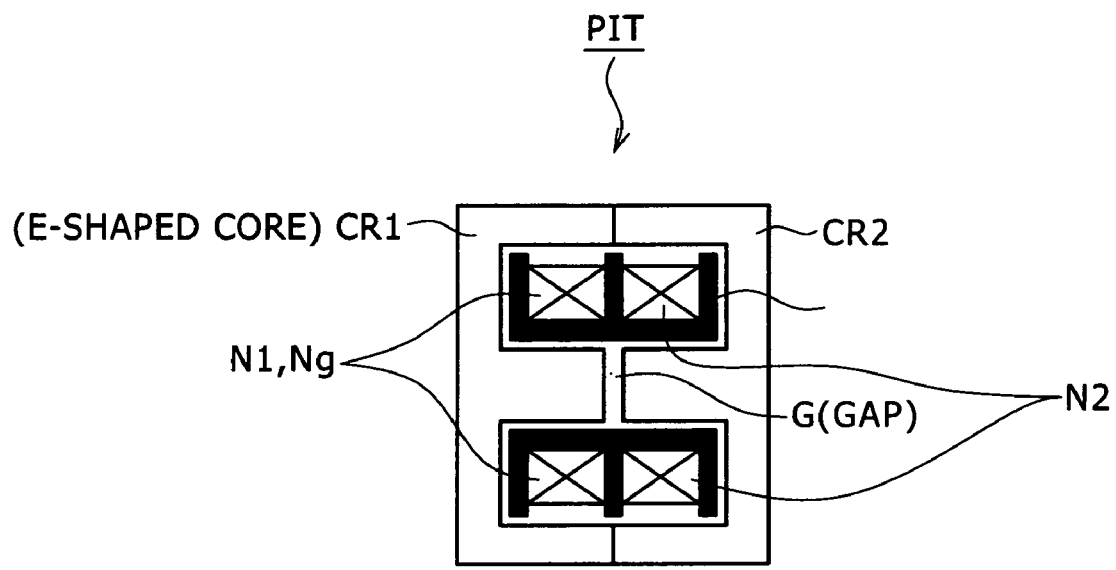
FIG. 5 is a diagram showing an example of structure of an isolated converter transformer in the present embodiment.

Further details of the switching power supply circuit shown in FIG. 4 will be described below. FIG. 5 shows an example of structure of the isolated converter transformer PIT provided in the power supply circuit of FIG. 4 having the above-described configuration. The isolated converter transformer PIT has an EE-shaped core formed by combining an E-type core CR1 and an E-type core CR2 of ferrite material with each other. Also, the isolated converter transformer PIT has a bobbin B formed by a resin or the like, and having a primary side winding part and a secondary side winding part divided from each other so as to be independent of each other. The primary winding N1 and the isolated converter transformer auxiliary winding Ng are wound around one winding part of the bobbin B. The secondary winding N2 is wound around the other winding part of the bobbin B.

The bobbin B thus wound with the primary side winding and the secondary side winding is attached to the above-described EE-shaped core (CR1 and CR2). Thereby the primary winding N1 and the isolated converter transformer auxiliary winding Ng, and the secondary winding N2 are wound around the central magnetic leg of the EE-shaped core in respective different winding regions. The structure of the isolated converter transformer PIT as a whole is thus obtained.

In addition, a gap G is formed in the central magnetic leg of the EE-shaped core as shown in the figure. Thereby a state of loose coupling is obtained as a coupling coefficient k. That is, a state of even looser coupling is obtained than in the isolated converter transformer PIT of the prior art power supply circuit shown in FIG. 14. Incidentally, the gap G can be formed by making the central magnetic legs of the E-type core CR1 and the E-type core CR2 shorter than the two outer magnetic legs of the E-type core CR1 and the E-type core CR2. In the present embodiment, an EER-35 is used as a core material, a gap G is set to 1.6 mm, the number of turns of the primary winding N1 is set to 48 T, the number of turns of the secondary winding N2 is set to 30 T, and the number of turns of the isolated converter transformer auxiliary winding Ng is set to 1 T. The coupling coefficient k between the primary side and the secondary side of the isolated converter transformer PIT itself is set to 0.75.

The choke coil PCC can also be formed by providing a winding to an EE-shaped core having a predetermined shape and a predetermined size. In the present embodiment, an ER-25 is used as a core material, a gap G is set to 0.8 mm, the number of turns of the choke coil winding N10 is set to 30 T, and 0.5 mH (millihenrys) is obtained as the value of inductance of the inductor L10. Thus, the value of inductance of the inductor L10 is reduced to make a first primary side series resonance frequency and a second primary side series resonance frequency close to each other, and reduce an iron loss and a copper loss in the choke coil PCC.

In obtaining experimental results to be described later, selections were made as follows for principal parts of the power supply circuit having the circuit form shown in FIG. 4.

The following values were selected for the capacitances of the primary side parallel resonant capacitor Cr, the primary side series resonant capacitor C11, the clamping capacitor C3, and the secondary side series resonant capacitor C4.

Cr=1000 pF
C11=0.027 µF
C3=0.1 µF
C4=0.068 µF

The following values were selected for the resistance Rg1 and the resistance Rg2.

Rg1=150Ω (ohms)
Rg2=100Ω

As for handled load power, maximum load power Pomax=300 W, and minimum load power Pomin=0 W (no load). A direct-current output voltage Eo is 175 V.

Figures 6A, 6B:
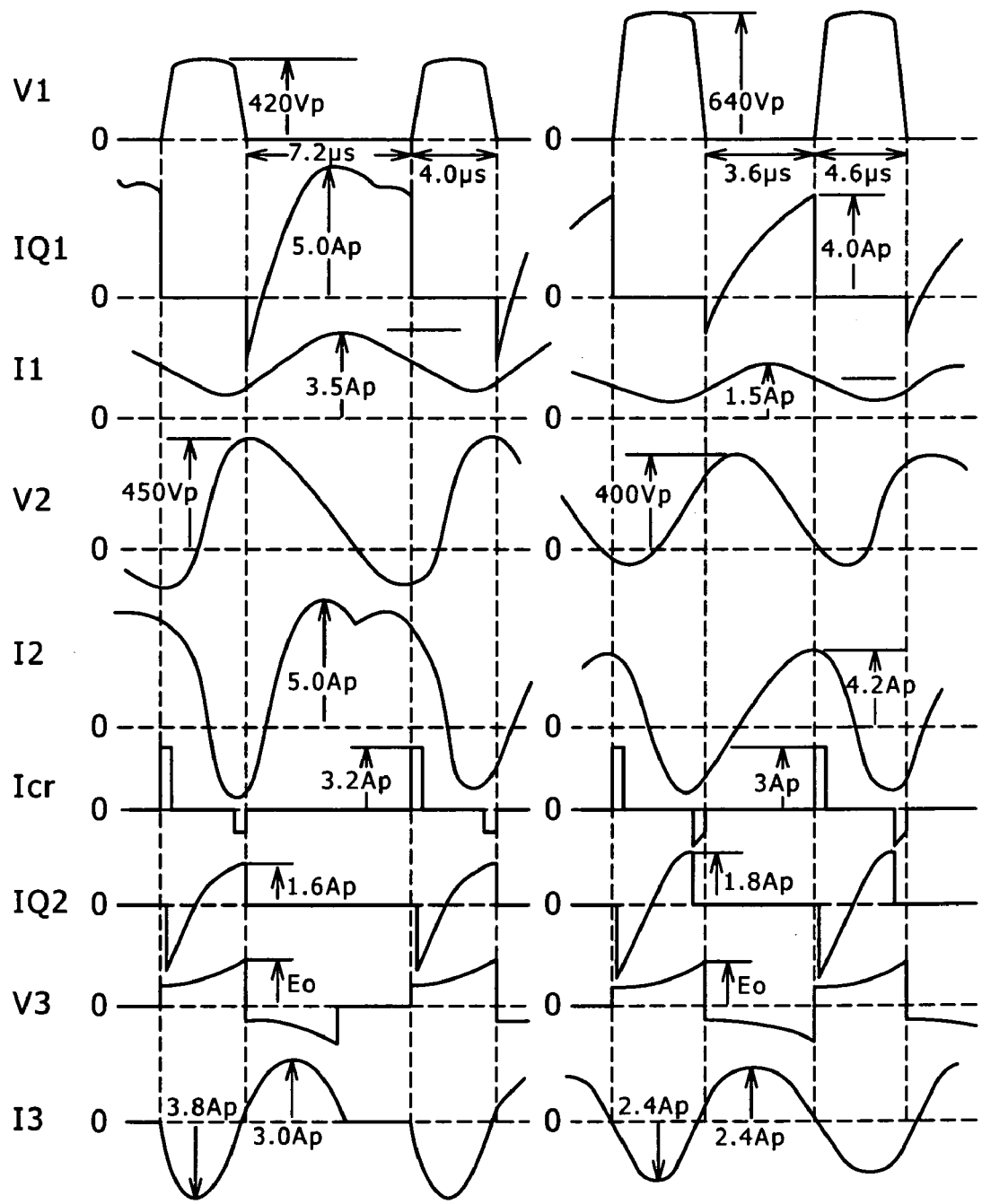
FIGS. 6A and 6B are waveform charts showing the operations of principal parts in the power supply circuit according to the embodiment on the basis of a switching period.

Waveform charts of FIG. 6A and FIG. 6B are cited as results of an experiment on the power supply circuit of FIG. 4. FIG. 6A shows, under conditions of the maximum load power Pomax=300 W and an input alternating voltage VAC=100 V, a switching voltage V1 as a voltage across the switching element Q1, a switching current IQ1 as a current flowing through the switching element Q1, an input current I1 as a current flowing through the choke coil PCC, a primary side series resonance voltage V2 as a voltage across the primary side series resonant capacitor C11, a primary winding current I2 as a current flowing through the primary winding N1, a primary side parallel resonance current ICr as a current flowing through the primary side parallel resonant capacitor Cr, an auxiliary switch current IQ2 as a current flowing through the auxiliary switch element Q2, a secondary winding voltage V3 as a voltage generated in the secondary winding N2, and a secondary winding current I3 as a current flowing through the secondary winding N2.

FIG. 6B shows, under conditions of the maximum load power Pomax=300 W and the input alternating voltage VAC=230 V, the switching voltage V1, the switching current IQ1, the input current I1, the primary side series resonance voltage V2, the primary winding current I2, the primary side parallel resonance current ICr, the auxiliary switch current IQ2, the secondary winding voltage V3, and the secondary winding current I3.

The fundamental operation of the power supply circuit of FIG. 4 will be described with reference to the waveform chart of FIG. 6A.

The switching element Q1 is supplied with a voltage across the smoothing capacitor Ci as a direct-current input voltage Ei, and performs a switching operation.

As for the switching voltage V1 (voltage between the drain and the source of the switching element Q1), the switching element Q1 is driven by a signal from the oscillating and driving circuit 2 to turn on or off a part between the drain and the source. In this case, the auxiliary switch current IQ2 flows through the clamping capacitor C3. Therefore the switching voltage V1 is raised to a low value of 420 V when the input alternating voltage VAC is 100 V, and is raised to a low value of 640 V when the input alternating voltage VAC is 230 V. That is, when the auxiliary switch element Q2 and the clamping capacitor C3 are not present, a sinusoidal resonant pulse waveform is obtained in the off period. The peak part of the sinusoidal resonant pulse waveform is clamped. However, a waveform around a rising edge of the sinusoidal wave is substantially the same as in a case where no clamping is performed, and an effect of ZVS operation in timing of turning off the switching element Q1 is sufficiently obtained.

The switching current IQ1 (current flowing through the switching element Q1) flows through the switching element Q1 (and a body diode DD1) from a drain side. A switching period is divided into a period TON during which the switching element Q1 is to be on and a period TOFF during which the switching element Q1 is to be off. The switching voltage V1 has a zero level during the period TON and has a resonant pulse waveform during the period TOFF. The voltage resonant pulse of the switching voltage V1 is obtained as a sinusoidal resonant waveform by the resonant operation of the primary side parallel resonant circuit.

The switching current IQ1 has a zero level during the period TOFF. When the period TON is started and turn-on timing is reached after the period TOFF is ended, the switching current IQ1 first flows through the body diode DD1, and thus has a waveform of negative polarity. Then, the switching current IQ1 is inverted to flow from the drain to the source, and thus has a waveform of positive polarity.

The input current I1 (current flowing from the smoothing capacitor Ci into the primary side switching converter) flows via a combined inductance of the inductance of the inductor L10 formed by the choke coil winding N10 and the leakage inductor L1 of the primary winding N1. Thus, the current flowing from the smoothing capacitor Ci into the switching converter is a pulsating current.

The primary side series resonance voltage V2 (voltage across the primary side series resonant capacitor C11) has an alternating waveform close to a sinusoidal wave corresponding to the switching period.

The primary winding current I2 (current flowing through the primary winding N1) flows through the primary winding N1 according to the switching operation of the switching element Q1. In this case, the primary winding current I2 has a waveform obtained by substantially combining the switching current IQ1 and the primary side parallel resonance current ICr with each other. The switching element Q1 performs on/off operation, whereby the resonance pulse voltage as the switching voltage V1 during the period TOFF is applied to the series connection circuit of the primary winding N1 and the primary side series resonant capacitor C11 forming a primary side series resonant circuit. Thereby, the primary side series resonant circuit performs resonant operation, and the primary winding current I2 has an alternating waveform including a sinusoidal component and corresponding to the switching period.

The primary side parallel resonance current ICr (current flowing through the primary side parallel capacitor) flows with positive polarity through the primary side parallel resonant capacitor Cr, whereby an operation of charging the primary side parallel resonant capacitor Cr is started. Accordingly, the switching voltage V1 starts rising from a zero level sinusoidally, and a voltage resonant pulse rises. When the primary side parallel resonance current ICr is inverted to negative polarity, the primary side parallel resonant capacitor Cr makes a transition from a state of being charged to a discharging state, and the voltage resonant pulse falls from a peak level. Such an operation indicates that ZVS operation by the primary side parallel resonant circuit and ZCS operation by the primary side series resonant circuit are obtained at times of turning on and turning off the switching element Q1. Thus, the primary side parallel resonance current ICr (current flowing through the primary side parallel resonant capacitor Cr) flows in timing of a rising edge of the switching voltage V1 and a falling edge of the switching voltage V1 to reduce a switching loss of the switching element Q1.

The auxiliary switch current IQ2 (current flowing through the auxiliary switch element Q2) flows each time the switching element Q1 is turned off, so as to clamp the switching voltage V1 and thereby prevent an excessive voltage from being applied between the drain and the source of the switching element Q1. That is, the primary winding current I2 and a voltage generated in the primary winding N1 and a voltage generated in the isolated converter transformer auxiliary winding Ng are shifted in phase by 90° from each other. In timing of turning off the switching element Q1, a voltage that turns on the switching element auxiliary switch element Q2 is generated across the isolated converter transformer auxiliary winding Ng, so that the auxiliary switch element Q2 is turned on to pass a current through the clamping capacitor C3, thus preventing an increase in voltage between the drain and the source of the switching element Q1.

The secondary winding voltage V3 (voltage across the secondary winding N2) is clamped to an absolute value level corresponding to the direct-current output voltage Eo during a conduction period of the rectifier diodes Do1 to Do4.

The secondary winding current I3 (current flowing through the secondary winding N2) is close to a sinusoidal current.

Figure 7:
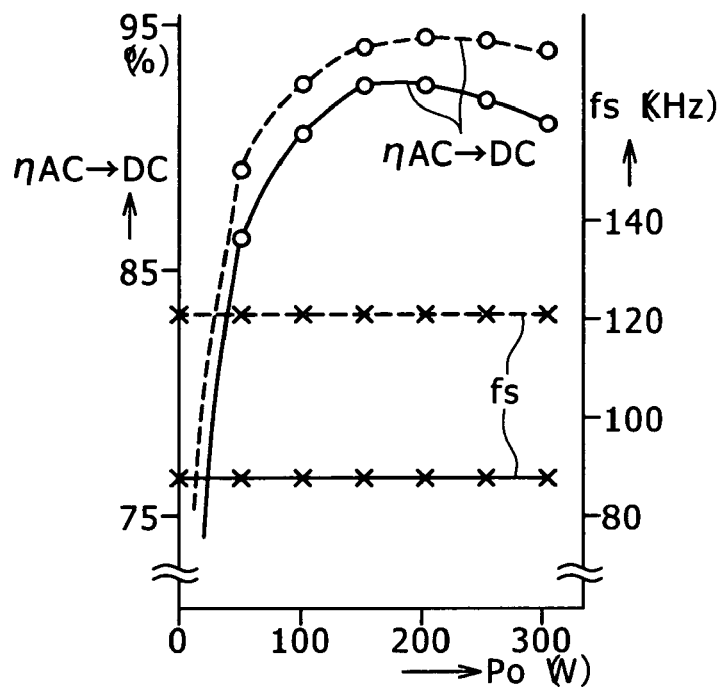
FIG. 7 is a diagram showing characteristics of variation of AC→DC power conversion efficiency and switching frequency of the power supply circuit according to the embodiment with respect to load variation.
Figure 8:
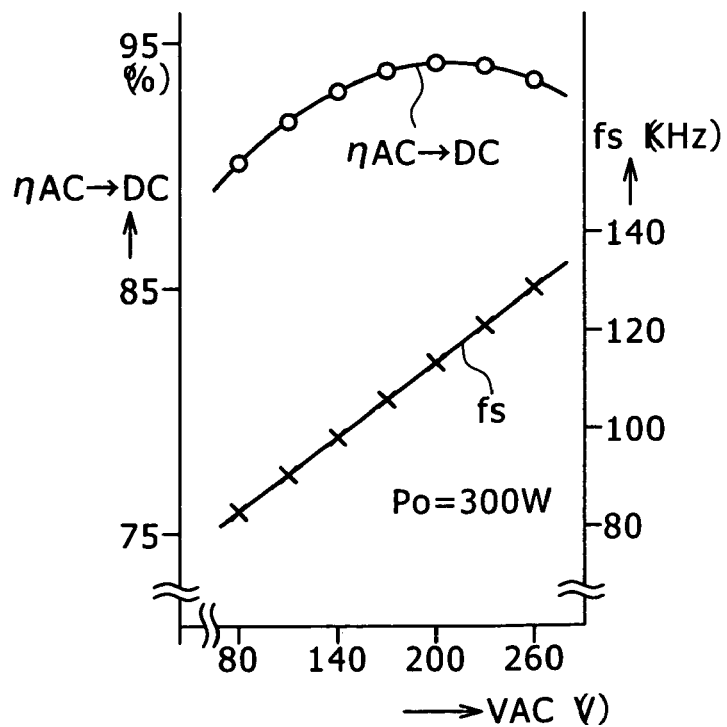
FIG. 8 is a diagram showing characteristics of variation of the AC→DC power conversion efficiency and the switching frequency of the power supply circuit according to the embodiment with respect to variation in alternating input voltage.

FIG. 7 and FIG. 8 show characteristics of the power supply circuit according to the present embodiment shown in FIG. 4. FIG. 7 shows AC-to-DC power conversion efficiency ($\Theta$AC→DC) and switching frequency fs of the modified class E switching operation multiple resonant converter according to the present embodiment with load power in a range of 0 W to 300 W when the input alternating voltage VAC is 100 V and when the input alternating voltage VAC is 230 V. Solid lines shown in FIG. 7 indicate the case where the value of the input alternating voltage VAC is 100 V. Broken lines shown in FIG. 7 indicate the case where the value of the input alternating voltage VAC is 230 V.

FIG. 8 shows the AC-to-DC power conversion efficiency ($\eta$AC→DC) and the switching frequency fs of the modified class E switching operation multiple resonant converter according to the present embodiment when the load power is 300 W with the input alternating voltage VAC in a range of 85 V to 230 V.

As shown in FIG. 7, when the value of the input alternating voltage VAC is 100 V, the AC-to-DC power conversion efficiency reaches 91.5%, while the switching frequency fs is 88 kHz, and a variable range $\Delta$fs of the switching frequency fs is 0 kHz. Thus excellent results were obtained. When the value of the input alternating voltage VAC is 230 V, the AC-to-DC power conversion efficiency reaches 94.1%, while the switching frequency fs is in a range of 122.5 kHz to 124 kHz, and the variable range $\Delta$fs of the switching frequency fs is 1.5 kHz. Thus, the direct-current output voltage is stabilized by PFM (pulse frequency modulation) and PWM (pulse width modulation). In either of the cases where the value of the input alternating voltage VAC is 100 V and where the value of the input alternating voltage VAC is 230 V, the variable range $\Delta$fs of the switching frequency fs is dramatically reduced as compared with the circuit shown as background art in FIG. 17. A reason for this is that the variable range $\Delta$fs can be narrowed by providing the first primary side series resonant circuit, the second primary side series resonant circuit, and the secondary side series resonant circuit having substantially the same resonance frequency, and additionally providing the isolated converter transformer auxiliary winding Ng to the isolated converter transformer PIT so that the time ratio (period TON/period TOFF) of the switching element Q1 and the auxiliary switch element Q2 changes in response to variations in the load power and the input alternating voltage VAC. Further, the primary side parallel resonant capacitor Cr is added to form the primary side parallel resonant circuit, whereby the present embodiment further narrows the variable range Δfs and can use a MOS-FET having a low on resistance, thus improving efficiency.

As shown in FIG. 8, when a load power of 300 W is supplied, the switching frequency fs rises as the input alternating voltage VAC is increased. The AC-to-DC power conversion efficiency (ηAC→DC) with the input alternating voltage VAC in a range of 170 V to 220 V is a high efficiency of 94%. The value of the AC-to-DC power conversion efficiency represents high efficiency over a wide alternating input voltage range as compared with that of the circuit shown as background art in FIG. 17.

In the power supply circuit shown in FIG. 17 as conventional example, the current flowing from the smoothing capacitor Ci into the switching converter flows into the switching element Q1 and the primary side parallel resonant capacitor Cr via the primary winding N1 of the isolated converter transformer PIT. In this case, the current flowing from the smoothing capacitor Ci into the switching converter is the primary winding current I2, and thus has a relatively high frequency determined by the switching period. That is, charging and discharging current flows through the smoothing capacitor Ci with a high frequency with reference to the period of commercial alternating-current power.

Since a part element as the smoothing capacitor Ci is required to have a high withstand voltage, for example, an aluminum electrolytic capacitor is often used. As compared with other kinds of capacitors, the aluminum electrolytic capacitor tends to decrease in capacitance and increase in the tangent of a loss angle when operated at a high frequency. Therefore, a special product having a low ESR (equivalent series resistance) and having a high permissible ripple current value is selected as aluminum electrolytic capacitor to be used for the smoothing capacitor Ci. In addition, an appropriately large value needs to be selected as the capacitance of the element as the smoothing capacitor Ci. When the configuration of the power supply circuit of FIG. 17 is made to handle the maximum load power Pomax=300 W, which is equal to that of the present embodiment, for example, about 1000 pF is selected. Such an aluminum electrolytic capacitor is more expensive than a general-purpose aluminum electrolytic capacitor, and is disadvantageous in terms of cost including an increase in part price corresponding to an increase in capacitance.

On the other hand, in the power supply circuit according to the present embodiment shown in FIG. 4, the current flowing from the smoothing capacitor Ci into the switching converter flows to the switching element Q1 side via the series connection of the choke coil winding N10 and the primary winding N1. Thus, the current flows only in a direction to flow from the smoothing capacitor Ci into the switching converter, and is a pulsating current close to a direct current, as shown as the primary winding current I1 in FIG. 6A. Since the current flowing from the smoothing capacitor Ci into the switching converter is thus substantially a direct current, the present embodiment does not cause the problems of a decrease in capacitance and an increase in the tangent of a loss angle as described above. With this, a ripple having the period of commercial alternating-current power in the direct-current input voltage Ei is reduced. For such reasons, a general-purpose aluminum electrolytic capacitor can be selected as the smoothing capacitor Ci in the present embodiment. In addition, because of a low ripple voltage, a lower value than in the case of the circuit of FIG. 17 can be selected as the capacitance of the element as the smoothing capacitor Ci. Thus, the present embodiment makes it possible to reduce the cost of the smoothing capacitor Ci. Further, the input current I1 has a sinusoidal waveform, and thereby an effect of reducing high-frequency noise is obtained.

In addition, abnormal operation at a time of intermediate load is eliminated in the circuit of FIG. 4 to which the class E switching converter is applied as the primary side switching converter. Proper ZVS operation is obtained in the circuit of FIG. 4. In this phenomenon of abnormal operation, as shown in FIG. 19B, the switching element Q1 is turned on before turn-on timing (a start of a period TON), and the switching current IQ1 of positive polarity flows from the source to the drain. Such an operation of the switching current IQ1 increases a switching loss. In the present embodiment, the operation of the switching current IQ1 which operation corresponds to the abnormal operation does not occur, and thereby the switching loss is not increased. This is one factor in improvement of power conversion efficiency.

Figure 19A:
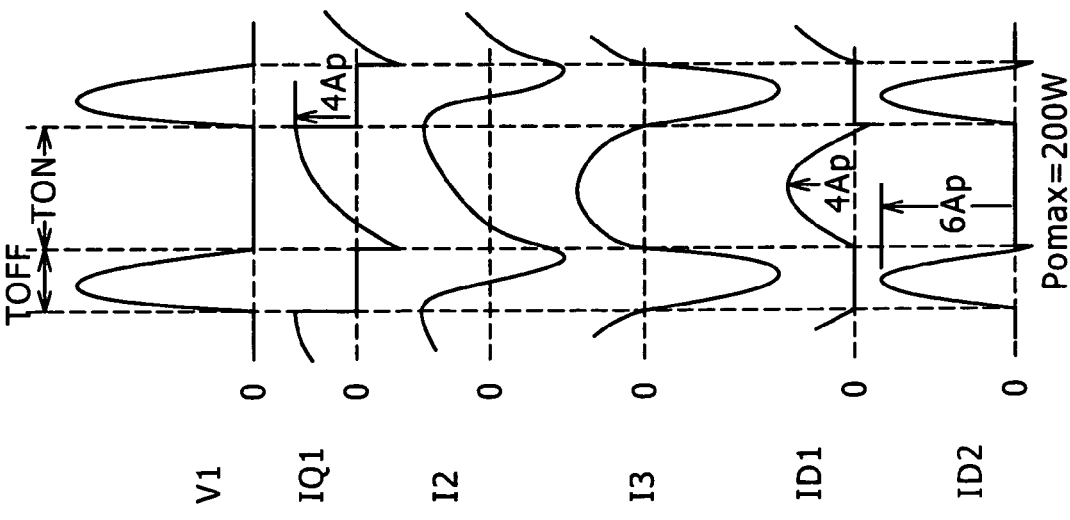
Figure 20:
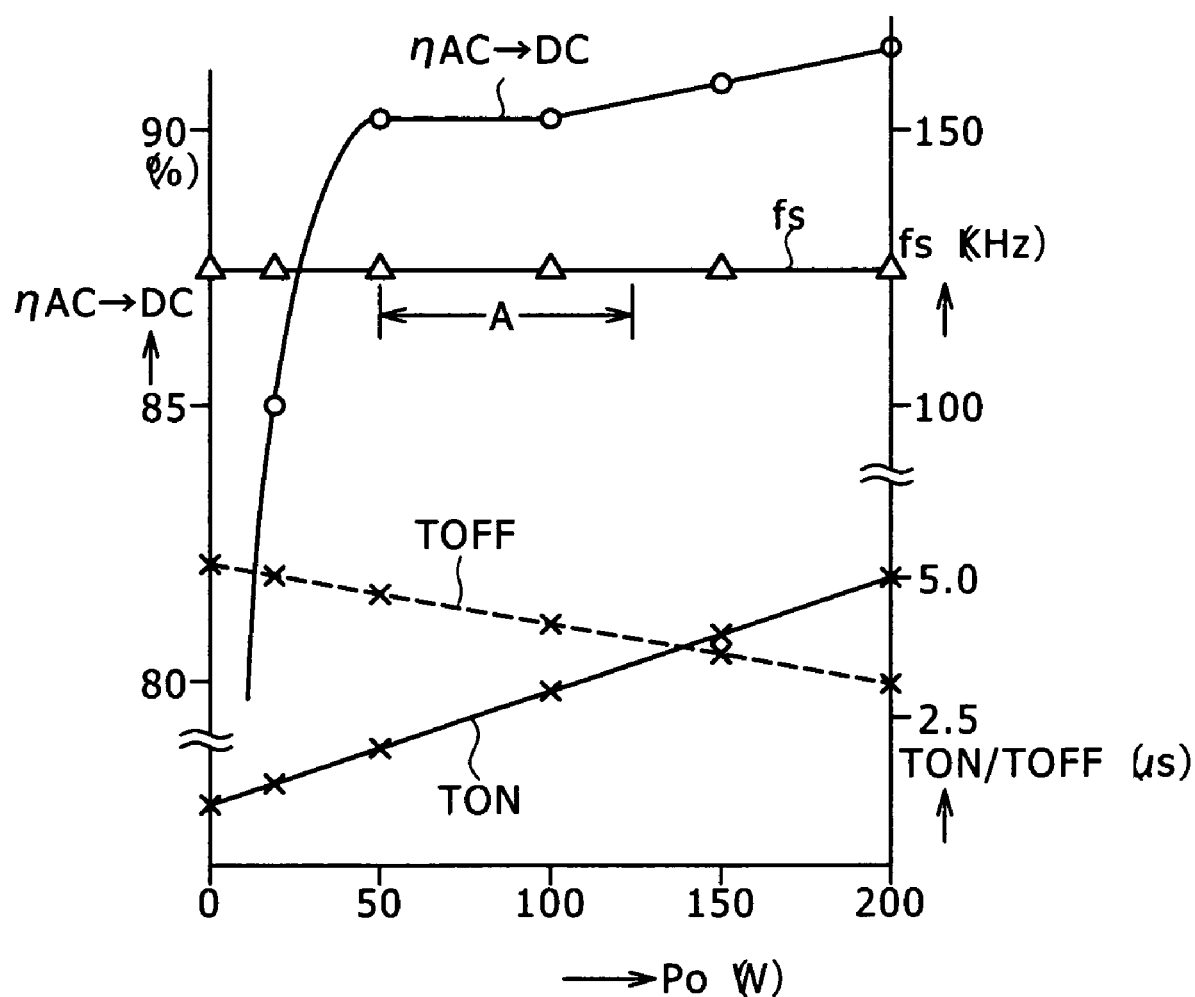
FIG. 20 is a diagram showing characteristics of variation of AC-to-DC power conversion efficiency, switching frequency, and the on period of a switching element of the power supply circuit shown as background art with respect to load variation.
Figure 21:
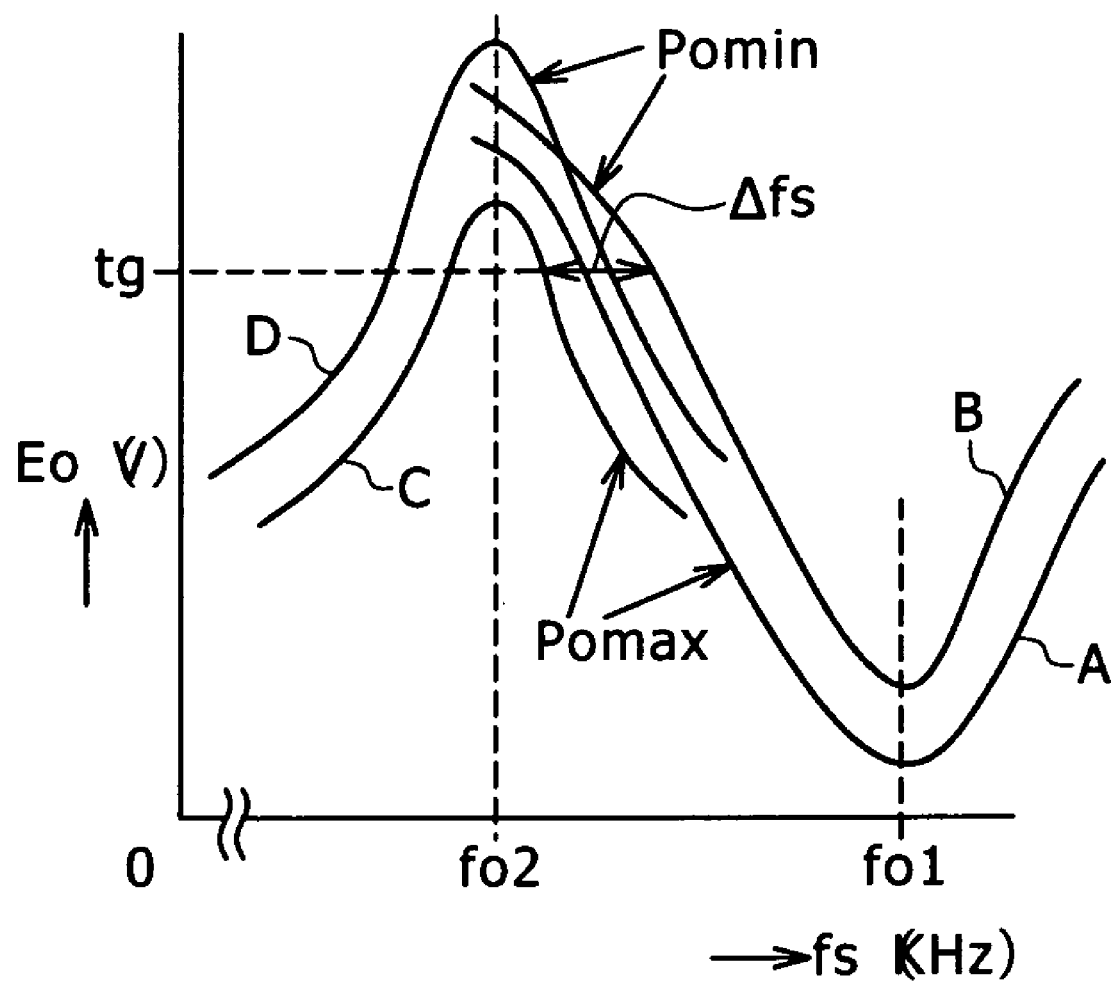
FIG. 21 is a diagram conceptually showing constant-voltage control characteristics of the power supply circuit shown as background art.

As is understood by comparison between the switching currents IQ1 in FIG. 6A and FIG. 19A, the waveform of the switching current IQ1 in FIG. 6A corresponding to the present embodiment has a peak before an end of a period TON. The waveform of the switching current IQ1 shown in FIG. 6A indicates that the level of the switching current IQ1 at a time of turn-off is reduced. When the level of the switching current IQ1 at a time of turn-off is reduced, the switching loss at the time of turn-off is correspondingly reduced, and thus power conversion efficiency is improved.

Such a waveform of the switching current IQ1 is obtained by the class E switching operation of the primary side switching converter. In addition, in the present embodiment, the input current I1 has the waveform of a pulsating current, and thereby an effect of reducing high-frequency noise is obtained.

Further, the auxiliary switch element Q2 and the clamping capacitor C3 are provided, and the auxiliary switch current IQ2 is made to flow in synchronism with the turning off of the switching element Q1. Thereby the highest voltage value of the voltage applied to the switching element Q1 is about 640 V even when the value of the input alternating voltage VAC is 230 V. Thus, a withstand voltage required of the switching element Q1 can be greatly lowered to facilitate selection of the switching element Q1 and thus reduce the cost of the switching power supply circuit. For example, when the auxiliary switch element Q2 and the clamping capacitor C3 are not provided, the withstand voltage of the switching element Q1 needs to be about 1800 V. In this case, when a MOSFET is used, the value of on resistance of the MOSFET having such a high withstand voltage is about 7Ω with the present technology level. On the other hand, when the auxiliary switch element Q2 and the clamping capacitor C3 are provided, 900 V is sufficient as the withstand voltage of the switching element Q1. The value of on resistance of a MOSFET having such a low withstand voltage is about 1.2Ω with the present technology level. Thus, a loss caused by the on resistance is also reduced, so that AC-to-DC power conversion efficiency is improved, selection of the switching element Q1 is facilitated, and the cost is reduced. Incidentally, power consumption in the auxiliary switch element Q2 is low, and a gate driving circuit is formed by adding only the resistance Rg1, the resistance Rg2, and the isolated converter transformer auxiliary winding Ng. In consideration of a reduction in cost as a result of lowering the withstand voltage of the switching element Q1, the cost of the device as a whole is not increased, and the cost of the device as a whole is reduced instead. Further, an iron loss and a copper loss in the choke coil PCC are reduced to further improve efficiency.

Second Embodiment

Figure 9:
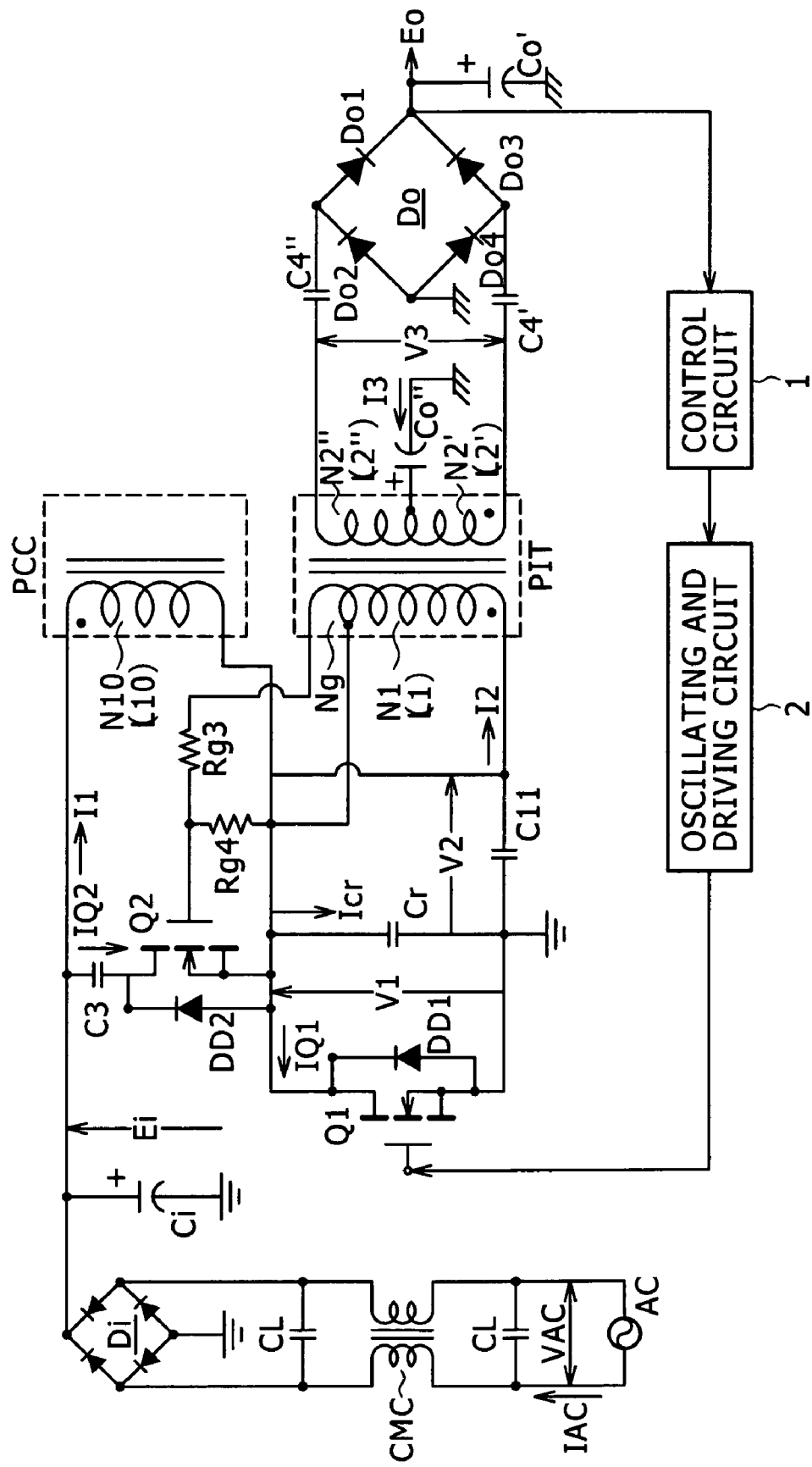
FIG. 9 is a circuit diagram showing an example of configuration of a power supply circuit according to a second embodiment.

FIG. 9 shows an example of configuration of a power supply circuit according to a second embodiment. Incidentally, a primary side in FIG. 9 is the same as in the first embodiment, and therefore description thereof will be omitted.

A voltage doubler full-wave rectifier circuit is formed on the secondary side. A secondary winding is formed by a partial winding N2' and a partial winding N2" in the same winding direction as the partial winding N2', the partial winding N2' and the partial winding N2" being separated from each other by a center tap. A secondary side series resonant capacitor is formed by a secondary side series resonant capacitor C4' and a secondary side series resonant capacitor C4". A secondary side smoothing capacitor is formed by a secondary side smoothing capacitor Co' and a secondary side smoothing capacitor Co". A secondary side rectifying element is formed by rectifier diodes Do1 to Do4 connected to each other by bridge connection. One terminal of the secondary side series resonant capacitor C4' is connected with one input side of a bridge connection formed by the rectifier diodes Do1 to Do4. One terminal of the secondary side series resonant capacitor C4" is connected with another input side of the bridge connection formed by the rectifier diodes Do1 to Do4. The secondary side smoothing capacitor Co' is connected to one output side of the rectifier diodes Do1 to Do4 connected to each other by the bridge connection. Another output side of the rectifier diodes Do1 to Do4 connected to each other by the bridge connection is connected to the center tap of the secondary winding via the secondary side smoothing capacitor Co".

As for handled load power, maximum load power Pomax=300 W, and minimum load power Pomin=0 W (no load). A direct-current output voltage Eo is 175 V.

Figures 10A, 10B:
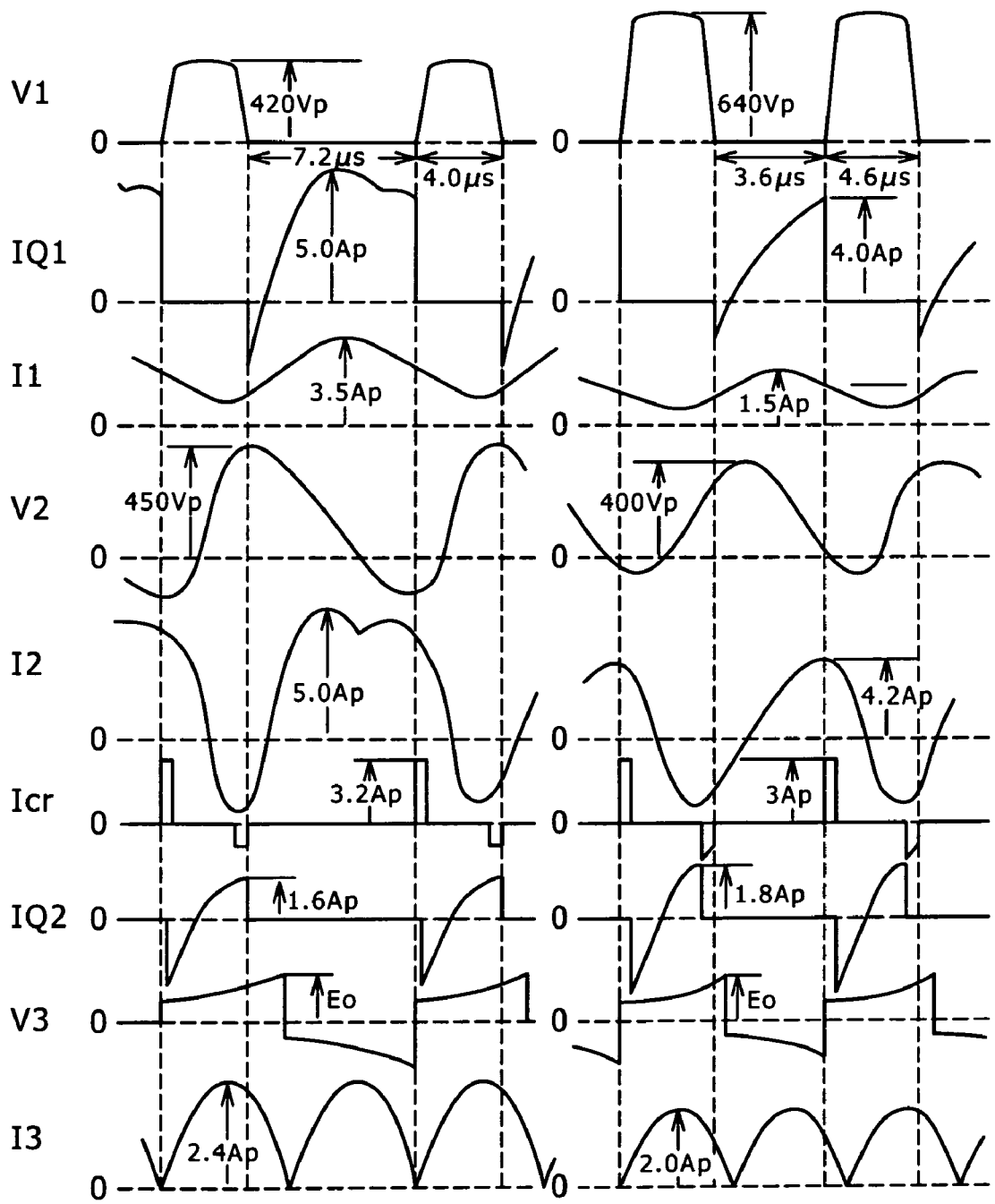
FIGS. 10A and 10B are waveform charts showing the operations of principal parts in the power supply circuit according to the second embodiment on the basis of a switching period.

Waveform charts of FIG. 10A and FIG. 10B are cited as results of an experiment on the power supply circuit of FIG. 9. FIG. 10A shows, under conditions of the maximum load power Pomax=300 W and an input alternating voltage VAC=100 V, a switching voltage V1 as a voltage across a switching element Q1, a switching current IQ1 as a current flowing through the switching element Q1, an input current I1 as a current flowing through a choke coil PCC, a primary side series resonance voltage V2 as a voltage across a primary side series resonant capacitor C11, a primary winding current I2 as a current flowing through a primary winding N1, a primary side parallel resonance current ICr as a current flowing through a primary side parallel resonant capacitor Cr, an auxiliary switch current IQ2 as a current flowing through an auxiliary switch element Q2, a secondary winding voltage V3 as a voltage generated in the secondary winding N2, and a secondary winding current I3 as a current flowing through the secondary winding N2.

FIG. 10B shows, under conditions of the maximum load power Pomax=300 W and the input alternating voltage VAC=230 V, the switching voltage V1, the switching current IQ1, the input current I1, the primary side series resonance voltage V2, the primary winding current I2, the primary side parallel resonance current ICr, the auxiliary switch current IQ2, the secondary winding voltage V3, and the secondary winding current I3.

The fundamental operation of the power supply circuit of FIG. 9 will be described with reference to the waveform chart of FIG. 10A.

The switching element Q1 is supplied with a voltage across the smoothing capacitor Ci as a direct-current input voltage Ei, and performs a switching operation.

As for the switching voltage V1 (voltage between the drain and the source of the switching element Q1), the switching element Q1 is driven by a signal from an oscillating and driving circuit 2 to turn on or off a part between the drain and the source. In this case, the auxiliary switch current IQ2 flows through a clamping capacitor C3. Therefore the switching voltage V1 is raised to a low value of 420 V when the input alternating voltage VAC is 100 V, and is raised to a low value of 640 V when the input alternating voltage VAC is 230 V.

Figure 11:
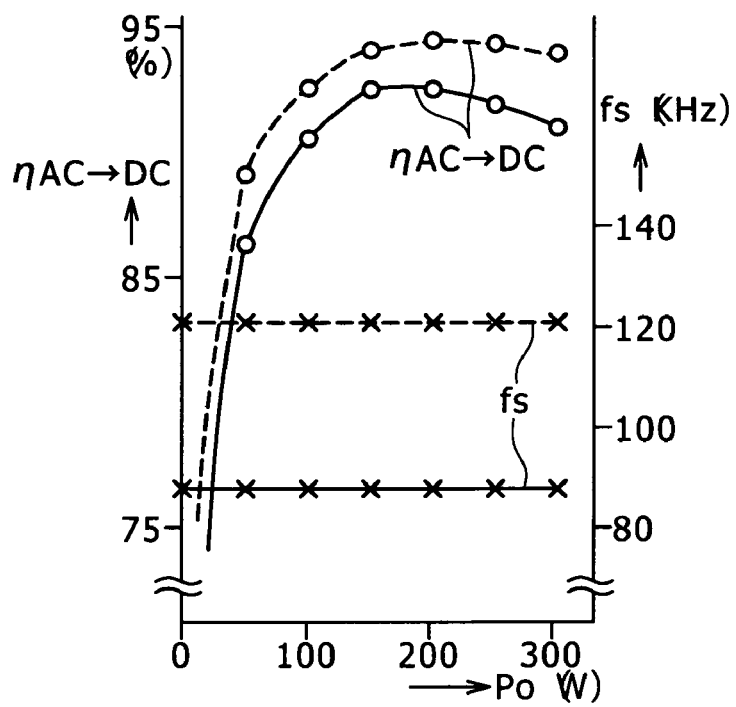
FIG. 11 is a diagram showing characteristics of variation of AC-to-DC power conversion efficiency and switching frequency of the power supply circuit according to the second embodiment with respect to load variation.
Figure 12:
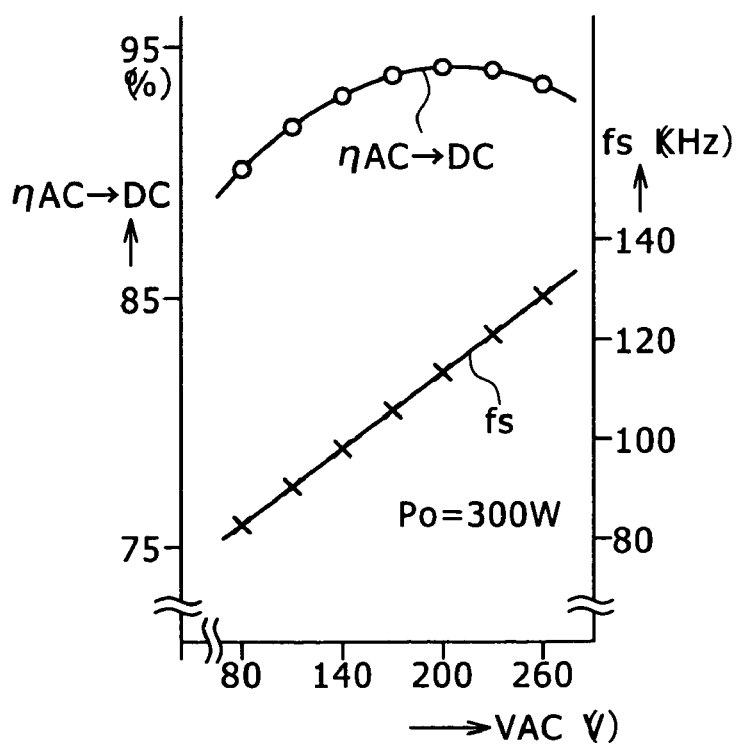
FIG. 12 is a diagram showing characteristics of variation of the AC-to-DC power conversion efficiency and the switching frequency of the power supply circuit according to the second embodiment with respect to variation in alternating input voltage.

FIG. 11 and FIG. 12 show characteristics of the power supply circuit according to the present embodiment shown in FIG. 9. FIG. 11 shows AC-to-DC power conversion efficiency ($\eta AC \rightarrow DC$) and switching frequency fs of the modified class E switching operation multiple resonant converter according to the present embodiment with load power in a range of 0 W to 300 W when the input alternating voltage VAC is 100 V and when the input alternating voltage VAC is 230 V. Solid lines shown in FIG. 11 indicate the case where the value of the input alternating voltage VAC is 100 V. Broken lines shown in FIG. 11 indicate the case where the value of the input alternating voltage VAC is 230 V.

FIG. 12 shows the efficiency ($\eta AC \rightarrow DC$) of power conversion from AC (alternating current) power to DC (direct current) power and the switching frequency fs of the modified class E switching operation multiple resonant converter according to the present embodiment when the load power is 300 W with the input alternating voltage VAC in a range of 85 V to 230 V.

As shown in FIG. 11, when the value of the input alternating voltage VAC is 100 V, the AC-to-DC power conversion efficiency reaches 91.8%, while the switching frequency fs is 88.4 kHz, and a variable range $\Delta fs$ of the switching frequency fs is 0 kHz. Thus excellent results were obtained. When the value of the input alternating voltage VAC is 230 V, the AC-to-DC power conversion efficiency reaches 94.3%, while the switching frequency fs is in a range of 123.7 kHz to 125.2 kHz, and the variable range $\Delta fs$ of the switching frequency fs is 1.5 kHz.

As shown in FIG. 12, when a load power of 300 W is supplied, the switching frequency fs rises as the input alternating voltage VAC is increased. The AC-to-DC power conversion efficiency ($\eta AC \rightarrow DC$) with the input alternating voltage VAC in a range of 170 V to 220 V is a high efficiency of 94%. The value of the AC-to-DC power conversion efficiency represents high efficiency over a wide alternating input voltage range as compared with that of the circuit shown as background art in FIG. 17.

(Modification of Primary Side Circuit in First Embodiment and Second Embodiment)

Figure 13:
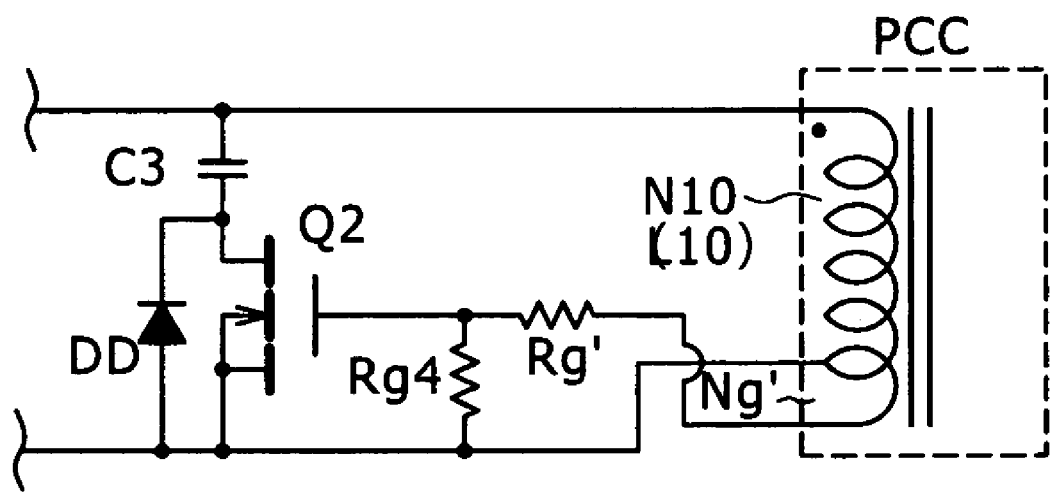
FIG. 13 is a circuit diagram showing an example of configuration of a power supply circuit according to a third embodiment as an example of modification of a primary side of the power supply circuits according to the first embodiment and the second embodiment.

A circuit shown in FIG. 13 has an additional choke coil auxiliary winding Ng' provided to a choke coil PCC in place of the isolated converter transformer auxiliary winding Ng of the isolated converter transformer PIT for generating a voltage for driving the auxiliary switch element Q2, and applies a voltage divided by a resistance Rg3 and a resistance Rg4 as a gate voltage for the auxiliary switch element Q2. The circuit shown in FIG. 13 produces similar effects to those of the above-described embodiments. However, the circuit shown in FIG. 13 has an advantage, in particular, of allowing circuit parts related to the choke coil PCC and the auxiliary switch element Q2 to be arranged close to each other.

(Modification of Secondary Side Circuit)

Figure 14:
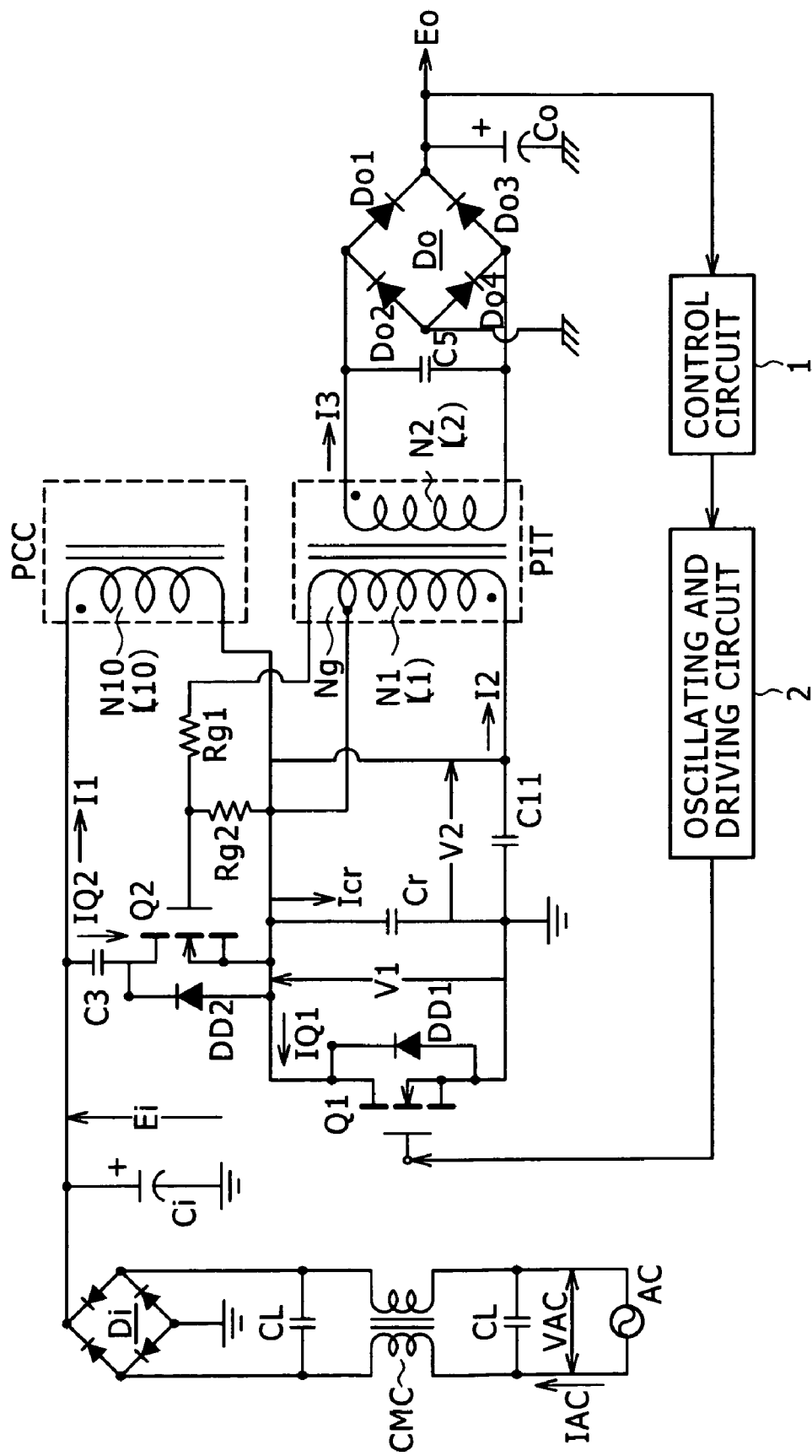
FIG. 14 shows an example of modification of a secondary side of the power supply circuit according to the second embodiment.

FIG. 14 shows an example of modification of the secondary side circuit. An isolated converter transformer PIT has a secondary winding N2, and as with a primary winding N1, the secondary winding N2 has a leakage inductor L2 because of loose coupling of the isolated converter transformer. A secondary side partial voltage resonant circuit governed by the leakage inductor L2 occurring in the secondary winding N2 of the isolated converter transformer PIT and a secondary side partial voltage resonant capacitor C5 is formed.

The secondary side partial voltage resonant circuit and a secondary side rectifying and smoothing circuit are connected in series with each other. The secondary side rectifying and smoothing circuit has a secondary side rectifying element and a secondary side smoothing capacitor. The secondary side rectifying element is formed by a bridge connection of rectifier diodes Do1 to Do4 having an input side and an output side. A point of connection between the rectifier diode Do1 and the rectifier diode Do2 and a point of connection between the rectifier diode Do3 and the rectifier diode Do4 are set as the input side. A point of connection between the rectifier diode Do1 and the rectifier diode Do3 and a point of connection between the rectifier diode Do2 and the rectifier diode Do4 are set as the output side. The smoothing capacitor Co is connected to the output side of the bridge connection. Such a secondary side rectifying and smoothing circuit is a full-wave rectifier circuit that rectifies both a positive voltage and a negative voltage generated in the secondary winding N2 and then uses the rectified voltages as load power.

In obtaining experimental results to be described later, selections were made as follows for principal parts of the power supply circuit having the circuit form shown in FIG. 14.

The following values were selected for the capacitances of a primary side parallel resonant capacitor Cr, a primary side series resonant capacitor C11, a clamping capacitor C3, and the secondary side partial voltage resonant capacitor C5.

Cr=1000 pF
C11=0.022 μF
C3=0.1 μF
C5=2200 pF

The following values were selected for the resistance Rg1 and the resistance Rg2.

Rg1=150Ω (ohms)
Rg2=100 Ω

As for handled load power, maximum load power Pomax=300 W, and minimum load power Pomin=0 W (no load). A direct-current output voltage Eo is 175 V.

The same results as in the waveform charts of FIG. 6A and FIG. 6B were obtained as results of an experiment on the power supply circuit of FIG. 14.

Figure 15A:
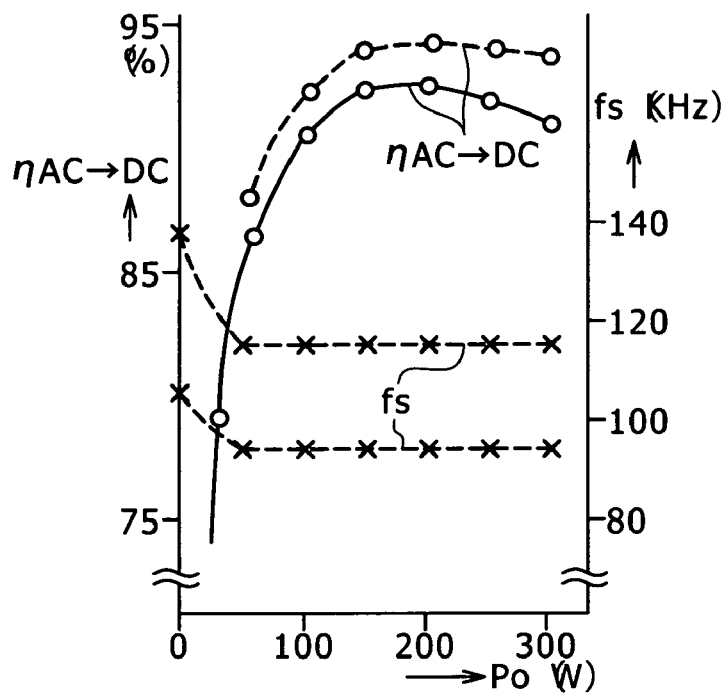
FIGS. 15A and 15B are diagrams showing characteristics of variation of AC-to-DC power conversion efficiency and switching frequency of the power supply circuit according to the second embodiment with respect to variation in load and variation in alternating input voltage.
Figure 15B:
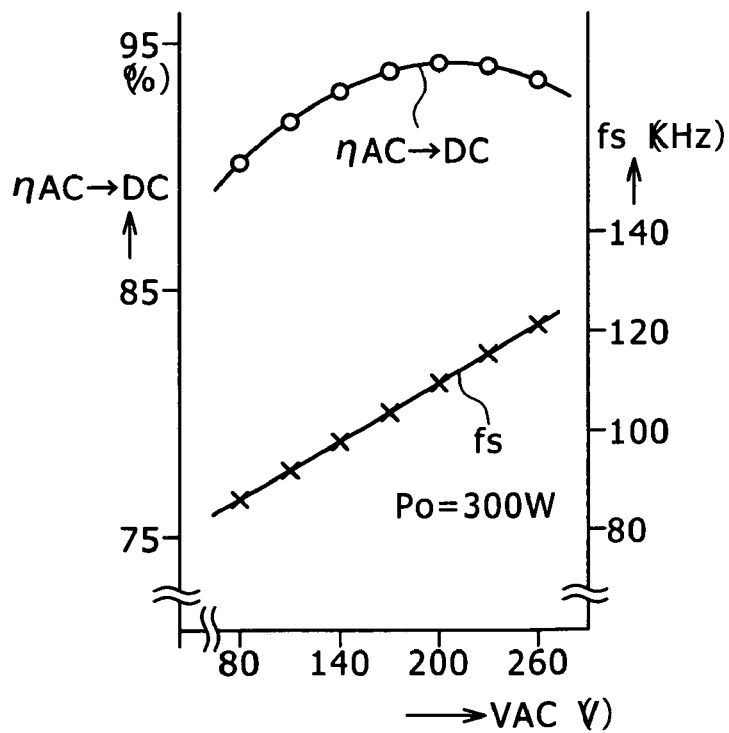

FIG. 15A and FIG. 15B show characteristics of the power supply circuit according to the present embodiment shown in FIG. 14. FIG. 15A shows AC-to-DC power conversion efficiency (ηAC→DC) and switching frequency fs of the modified class E switching operation multiple resonant converter according to the present embodiment with load power in a range of 0 W to 300 W when the input alternating voltage VAC is 100 V and when the input alternating voltage VAC is 230 V. Solid lines indicate the case where the value of the input alternating voltage VAC is 100 V. Broken lines indicate the case where the value of the input alternating voltage VAC is 230 V.

FIG. 15B shows the AC-to-DC power conversion efficiency (ηAC→DC) and the switching frequency fs of the modified class E switching operation multiple resonant converter according to the present embodiment when the load power is 300 W with the input alternating voltage VAC in a range of 85 V to 230 V.

As shown in FIG. 15A, when the value of the input alternating voltage VAC is 100 V, the AC-to-DC power conversion efficiency reaches 91%, while the switching frequency fs is in a range of 90.9 kHz to 104.2 kHz, and a variable range Δfs of the switching frequency fs is 13.3 kHz. Thus excellent results were obtained. When the value of the input alternating voltage VAC is 230 V, the AC-to-DC power conversion efficiency reaches 93.8%, while the switching frequency fs is in a range of 116.3 kHz to 138.3 kHz, and the variable range Δfs of the switching frequency fs is 22 kHz. In either of the cases where the value of the input alternating voltage VAC is 100 V and where the value of the input alternating voltage VAC is 230 V, the variable range Δfs of the switching frequency fs is dramatically reduced as compared with the circuit shown as background art in FIG. 17. A reason for this is that the variable range Δfs can be narrowed by providing a primary side series resonant circuit and the secondary side partial voltage resonant circuit, and additionally providing an isolated converter transformer auxiliary winding Ng to the isolated converter transformer PIT so that the time ratio (period TON/period TOFF) of the switching element Q1 and the auxiliary switch element Q2 changes in response to variations in the load power and the input alternating voltage VAC. Further, the primary side parallel resonant capacitor Cr is added to form a primary side parallel resonant circuit, whereby the present embodiment further narrows the variable range Δfs and thus improves efficiency.

As shown in FIG. 15B, when a load power of 300 W is supplied, the switching frequency fs rises as the input alternating voltage VAC is increased. The AC-to-DC power conversion efficiency (ηAC→DC) with the input alternating voltage VAC in a range of 170 V to 220 V is a high efficiency of 94%. The value of the AC-to-DC power conversion efficiency represents high efficiency over a wide alternating input voltage range as compared with that of the circuit shown as background art in FIG. 17.

Figure 16A:
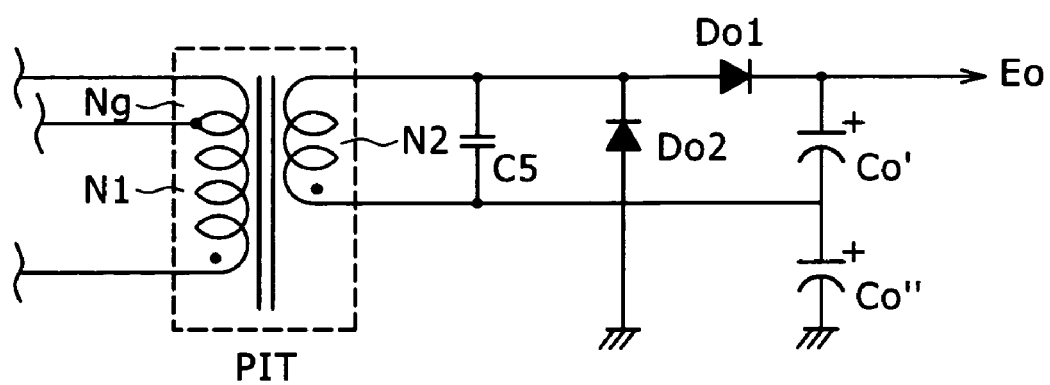
FIGS. 16A and 16B show examples of modification of the secondary side of the power supply circuits according to the first embodiment and the second embodiment.
Figure 16B:
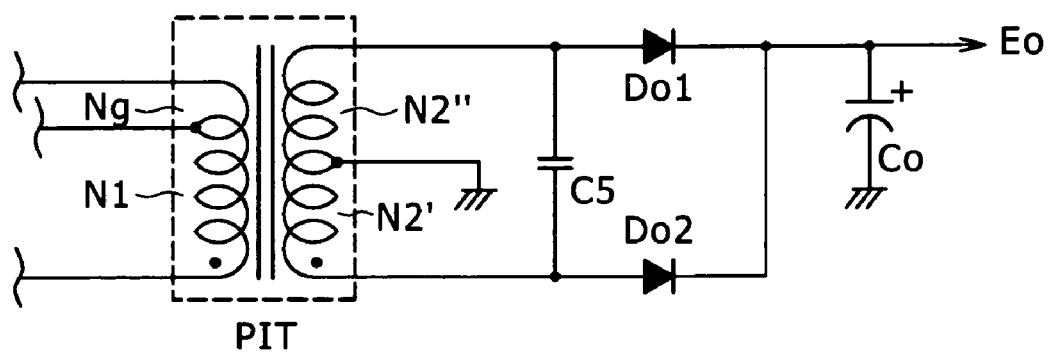

FIG. 16A and FIG. 16B also show examples of modification of the secondary side circuit. In either of the examples, a secondary side partial voltage resonant circuit is formed by a leakage inductor of a secondary winding and a secondary side partial voltage resonant capacitor C5. This secondary side partial voltage resonant circuit is connected in series with a secondary side rectifying and smoothing circuit. The circuit shown in FIG. 16A is a voltage doubler half-wave rectifier circuit, and thus has an advantage of providing a double rectified voltage. The voltage doubler half-wave rectifier circuit includes: a secondary side rectifying element formed by a series connection of a rectifier diode Do1 and a rectifier diode Do2 having different polarity terminals connected to each other; and a secondary side smoothing capacitor formed by a series connection of a smoothing capacitor Co' and a smoothing capacitor Co"; one terminal of the secondary side partial voltage resonant capacitor C5 being connected to a point of connection where the different polarity terminals of the rectifier diode Do1 and the rectifier diode Do2 are connected to each other; another terminal of the secondary side partial voltage resonant capacitor C5 being connected to a point of connection of the series connection of the smoothing capacitor Co' and the smoothing capacitor Co"; and the series connection of the rectifier diode Do1 and the rectifier diode Do2 being connected in parallel with the series connection of the smoothing capacitor Co' and the smoothing capacitor Co". Incidentally, the secondary side partial resonant circuit resonates only in on and off timing of the rectifier diodes forming the rectifying circuit.

FIG. 16B shows a double-wave rectifier circuit. A secondary winding is formed by a partial winding N2' and a partial winding N2" in the same winding direction as the partial winding N2', the partial winding N2' and the partial winding N2" being separated from each other by a center tap. A secondary side rectifying element is formed by a rectifier diode Do1 and a rectifier diode Do2 having polarity terminals of the same polarity connected to each other. Another polarity terminal (anode) of the rectifier diode Do1 which terminal has a polarity different from that of the polarity terminal (cathode) of the above-mentioned same polarity is connected to one terminal of a secondary side partial voltage resonant capacitor C4. Another polarity terminal (anode) of the rectifier diode Do2 which terminal has a polarity different from that of the polarity terminal (cathode) of the above-mentioned same polarity is connected to another terminal of, the secondary side partial voltage resonant capacitor C4. One terminal of a smoothing capacitor Co is connected to the polarity terminals (cathodes) of the above-mentioned same polarity. Another terminal of the secondary side smoothing capacitor is connected to the center tap of the secondary winding. Incidentally, the present invention is applicable to a case where a secondary side series resonant circuit is formed using a secondary side series resonant capacitor C4 in place of the secondary side partial resonant capacitor C5.

The present invention is not limited to the configurations shown as the respective embodiments. For example, an element other than a MOSFET, such for example as an IGBT (Insulated Gate Bipolar Transistor) or a bipolar transistor, may be selected as the main switching element (and the auxiliary switching element). In addition, while an externally excited switching converter is cited in each of the foregoing embodiments, the present invention is applicable to self-excited switching converters.

It should be understood by those skilled in the art that various modifications, combinations, sub-combinations and alterations may occur depending on design requirements and other factors insofar as they are within the scope of the appended claims or the equivalents thereof.

The invention claimed is:

1. A switching power supply circuit, comprising:
  a switching element that receives a direct-current (DC) voltage and performs a switching operation to convert the direct-current voltage to an alternating-voltage;
  a converter transformer having a primary winding on a primary side and a secondary winding on a secondary side, one end of the primary winding being supplied with the direct-current voltage via a choke coil, another end of the primary winding being connected to the switching element, the alternating voltage being input to the primary winding, and the secondary winding having an alternating voltage induced therein by the primary winding;
  a primary side parallel resonant capacitor connected in parallel with the switching element, the primary side parallel resonant capacitor forming a primary side parallel resonant circuit having a resonance frequency governed by an inductance of the choke coil, a leakage inductance occurring in the primary winding of the converter transformer, and a capacitance of the primary side parallel resonant capacitor;
  a primary side series resonant capacitor connected to a point of connection between the primary winding of the converter transformer and the choke coil, the primary side series resonant capacitor forming a first primary side series resonant circuit having a resonance frequency governed by the inductance of the choke coil and a capacitance of the primary side series resonant capacitor, and the primary side series resonant capacitor forming a second primary side series resonant circuit having a resonance frequency governed by the leakage inductance occurring in the primary winding of the converter transformer and the capacitance of the primary side series resonant capacitor;
  a series connection circuit of a clamping capacitor and an auxiliary switch element that conducts when the switching element is not conducting, the series connection circuit being connected in parallel with a series connection circuit of the choke coil and the primary winding of the converter transformer, and the series connection circuit clamping a peak of a resonant pulse waveform occurring in the primary side parallel resonant circuit when the switching element is not conducting;
  a secondary side rectifying and smoothing circuit having a secondary side rectifying element and a secondary side smoothing capacitor, the secondary side rectifying and smoothing circuit generating an output direct-current voltage by rectifying and smoothing the alternating voltage induced in the secondary winding; and
  switching element controlling means for controlling the switching element based on the output direct-current voltage.

2. The switching power supply circuit as claimed in claim 1,
  wherein the auxiliary switch element is controlled to conduct when the switching element is not conducting by a voltage induced in one of a converter transformer auxiliary winding provided in the converter transformer or a choke coil auxiliary winding provided in the choke coil.

3. The switching power supply circuit as claimed in claim 1,
  wherein the resonance frequency of the first primary side series resonant circuit and the resonance frequency of the second primary side series resonant circuit are set substantially equal to each other.

4. The switching power supply circuit as claimed in claim 1, further comprising a secondary side series resonant capacitor connected in series with the secondary winding of the converter transformer, the secondary side series resonant capacitor forming a secondary side series resonant circuit having a resonance frequency governed by a leakage inductance occurring in the secondary winding of the converter transformer and a capacitance of the secondary side series resonant capacitor.

5. The switching power supply circuit as claimed in claim 1, further comprising a secondary side partial resonant capacitor connected in series with the secondary winding of the converter transformer, the secondary side partial resonant capacitor forming a secondary side partial resonant circuit having a resonance frequency governed by a leakage inductance occurring in the secondary winding of the converter transformer and a capacitance of the secondary side partial resonant capacitor, the secondary side partial resonant circuit resonating in on and off timing of the secondary side rectifying element.

6. The switching power supply circuit as claimed in claim 4 or 5, wherein
the secondary side rectifying element is formed by a bridge connection of rectifier diodes having an input side and an output side;
the input side of the bridge connection of the rectifier diodes is connected to the secondary side series resonant capacitor or to the secondary side partial resonant capacitor; and
the secondary side smoothing capacitor is connected to the output side of the bridge connection of the rectifier diodes, whereby a full-wave rectifier circuit is formed.

7. The switching power supply circuit as claimed in claim 4 or 5, wherein
the secondary side rectifying element is formed by a series connection of a first rectifier diode and a second rectifier diode having different polarity terminals connected to each other;
the secondary side smoothing capacitor is connected in parallel with the series connection of the first rectifier diode and the second rectifier diode; and
one of the secondary side series resonant capacitor or the secondary side partial resonant capacitor is connected to a point of connection where the different polarity terminals of the first rectifier diode and the second rectifier diode are connected to each other, whereby a voltage doubler half-wave rectifier circuit is formed.

8. The switching power supply circuit as claimed in claim 4, wherein
the secondary winding includes a first partial winding and a second partial winding in a same winding direction as the first partial winding, the first partial winding and the second partial winding being separated from each other by a center tap;
the secondary side series resonant capacitor includes a first secondary side series resonant capacitor and a second secondary side series resonant capacitor;
the secondary side smoothing capacitor includes a first secondary side smoothing capacitor and a second secondary side smoothing capacitor;
the secondary side rectifying element includes a first to a fourth rectifier diode connected to each other in a bridge connection;
one terminal of the first secondary side series resonant capacitor is connected with one input side of the first to fourth rectifier diodes connected in the bridge connection;
one terminal of the second secondary side series resonant capacitor is connected with another input side of the first to fourth rectifier diodes connected in the bridge connection;
the first secondary side smoothing capacitor is connected to one output side of the first to fourth rectifier diodes connected in the bridge connection; and
another output side of the first to fourth rectifier diodes connected in the bridge connection is connected to the center tap of the secondary winding via the second secondary side smoothing capacitor, whereby a voltage doubler full-wave rectifier circuit is formed.

9. The switching power supply circuit as claimed in claim 1, further comprising a primary side rectifying and smoothing circuit having a primary side rectifying element for rectifying alternating-current power and a primary side smoothing capacitor for generating a rectified and smoothed voltage obtained by smoothing a rectified voltage from the primary side rectifying element,
wherein the rectified and smoothed voltage from the primary side rectifying and smoothing circuit is supplied as the direct-current voltage.

* * * * *